(12) United States Patent
Okada et al.

(10) Patent No.: US 7,094,493 B2
(45) Date of Patent: * Aug. 22, 2006

(54) HYDROGEN STORAGE METAL ALLOY, METHOD FOR ABSORPTION AND RELEASE OF HYDROGEN USING THE SAID ALLOY AND HYDROGEN FUEL BATTERY USING THE SAID METHOD

(75) Inventors: Masuo Okada, 9-6, Yagiyamaminami 3-chome, Takihaku-ku, Sendai-shi, Miyagi, 982-0807 (JP); Takahiro Kuriiwa, Utsunomiva (JP)

(73) Assignees: Tohoku Techno Arch Co., Ltd., (JP); Masuo Okada, (JP); Dowa Mining Co., Ltd., (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/991,725

(22) Filed: Nov. 18, 2004

(65) Prior Publication Data
US 2005/0129998 A1 Jun. 16, 2005

Related U.S. Application Data

(63) Continuation of application No. 09/937,652, filed as application No. PCT/JP99/06546 on Nov. 24, 1999, now Pat. No. 6,835,490.

(30) Foreign Application Priority Data
Mar. 29, 1999 (JP) .................................. 11-86866

(51) Int. Cl.
 H01M 10/52 (2006.01)
 H01M 10/34 (2006.01)
 C22F 1/18 (2006.01)
 C22C 14/00 (2006.01)

(52) U.S. Cl. .................. 429/59; 429/101; 148/669; 148/421; 420/900; 420/424; 420/428; 420/421

(58) Field of Classification Search ................ 420/900, 420/424, 428, 421; 148/669, 421; 429/59, 429/101, 19, 24, 22
See application file for complete search history.

(56) References Cited

U.S. PATENT DOCUMENTS 6,153,032 A * 11/2000 Iba et al. .................... 148/669
6,835,490 B1 * 12/2004 Okada et al. .................. 429/59

FOREIGN PATENT DOCUMENTS

| | | |
|---|---|---|
| JP | 52-20314 | 2/1977 |
| JP | 58-217654 | 12/1983 |
| JP | 60-65473 | 4/1985 |
| JP | 61-16880 | 5/1986 |
| JP | 61-250135 | 11/1986 |
| JP | 62-108701 | 5/1987 |
| JP | 5-29014 | 2/1993 |
| JP | 6-158194 | 6/1994 |
| JP | 6-174196 | 6/1994 |
| JP | 07-252560 | 10/1995 |
| JP | 8-157998 | 6/1996 |
| JP | 8-222252 | 8/1996 |
| JP | 10-110225 | 4/1998 |
| JP | 10-158755 | 6/1998 |

OTHER PUBLICATIONS

Hydrogen Storage Metal Alloy—Physical Properties and Applications, New Edition, by Yasuaki Osumi, published by Agne Technique Center, Japan, first printing of the first edition issued on Oct. 30, 1993, p. 309.

* cited by examiner

Primary Examiner—Bruce F. Bell
(74) Attorney, Agent, or Firm—Hayes Soloway P.C.

(57) ABSTRACT

A method for absorbing and releasing hydrogen comprises applying repeatedly hydrogen pressurization and depressurization to a hydrogen storage metal alloy of a body-centered cubic structure-type phase exerting a two-stage or inclined plateau characteristic in a hydrogen storage amount vs hydrogen pressure relation in an appropriate fashion to absorb and release hydrogen. At least at one stage during the release of hydrogen, the temperature ($T2$) of the above-mentioned hydrogen storage metal alloy is made higher than the temperature ($T1$) of the hydrogen storage metal alloy during the hydrogen absorption process ($T2>T1$). This enables the release and utilization of occluded hydrogen at a low-pressure plateau region or an inclined plateau lower region.

22 Claims, 22 Drawing Sheets

Typical Relationship between Hydrogen Dissociation Curve and Temperature in a $LaNi_5$ System, etc.

Changes in Hydrogen Release Amount by Temperature Rise upon Desorption of Hydrogen in a LaNi₅ System, etc.

F I G. 4
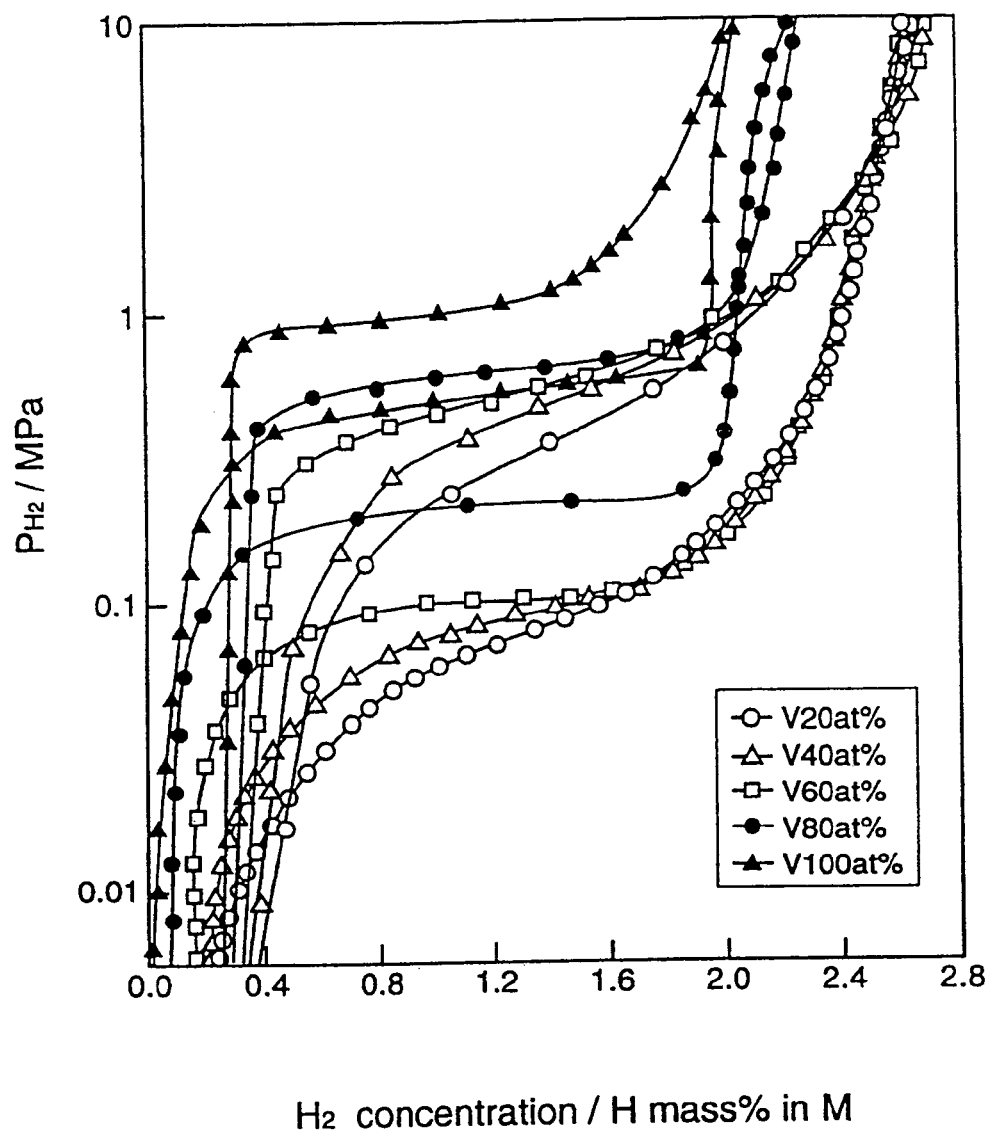

F I G. 7
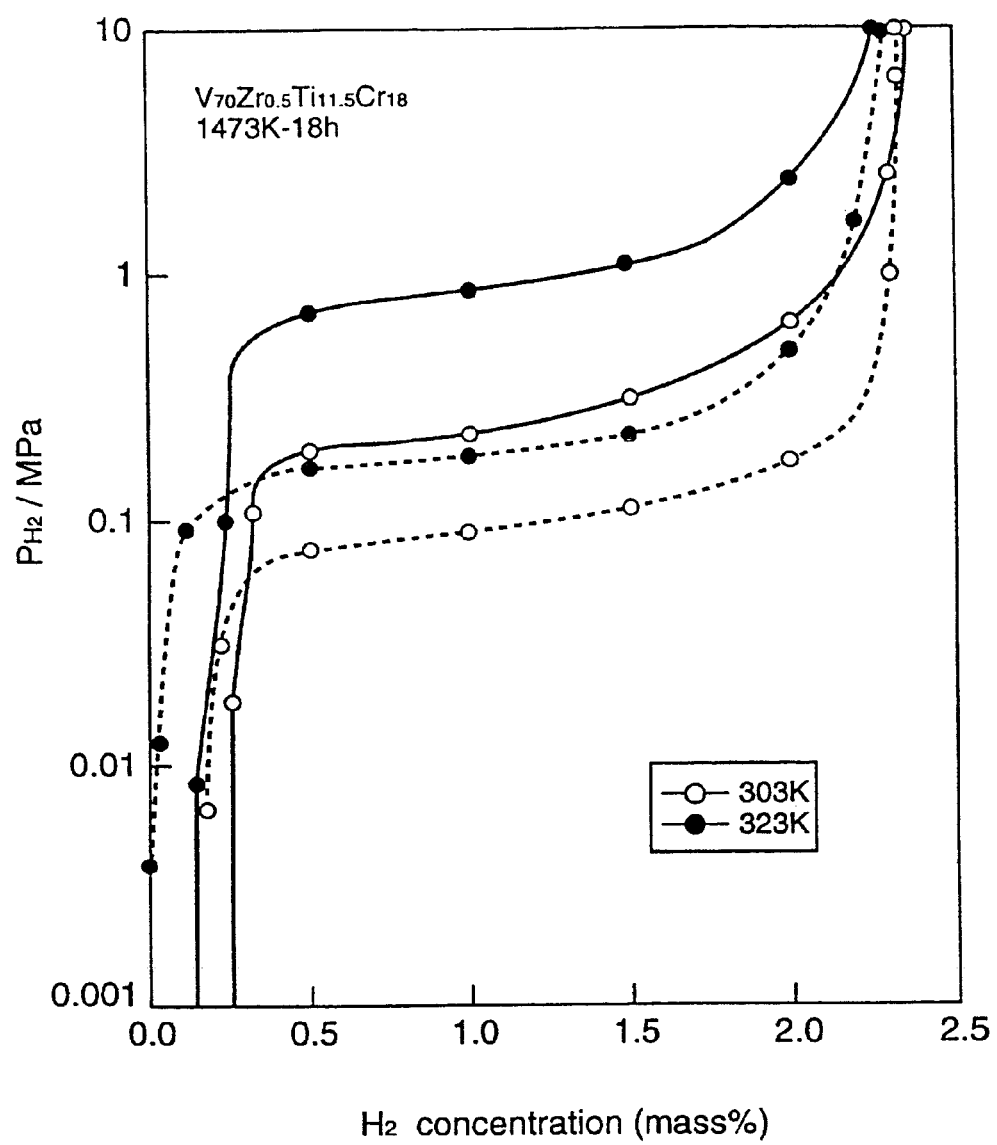

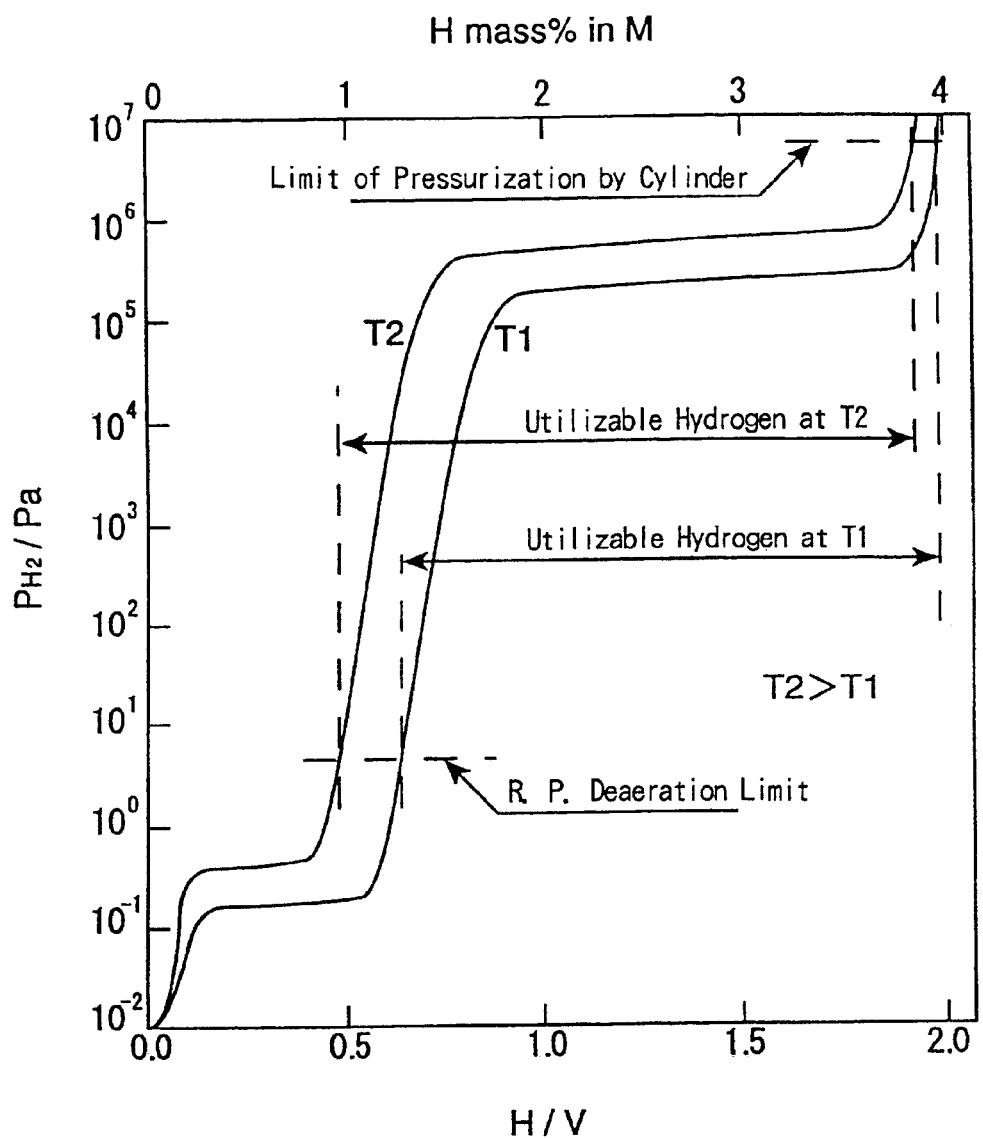
F I G. 8

F I G. 12
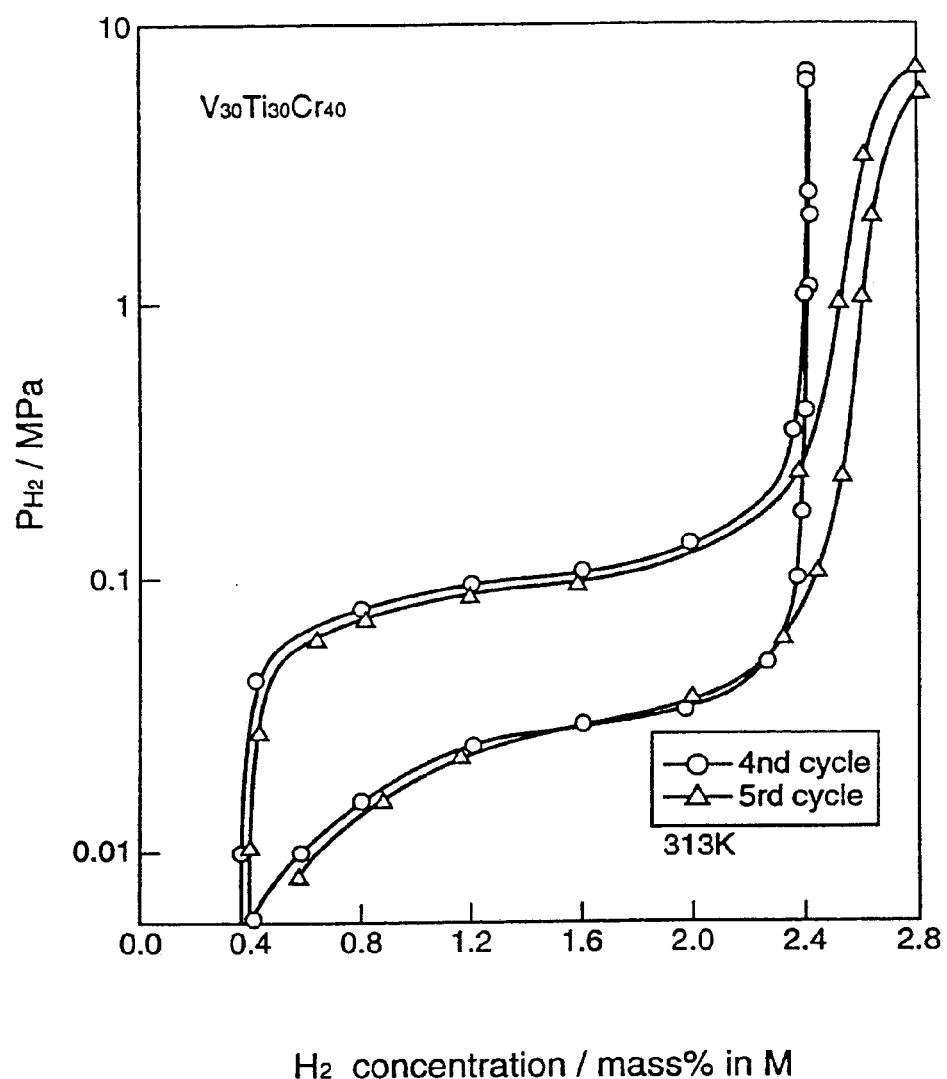

HYDROGEN STORAGE METAL ALLOY, METHOD FOR ABSORPTION AND RELEASE OF HYDROGEN USING THE SAID ALLOY AND HYDROGEN FUEL BATTERY USING THE SAID METHOD

CROSS REFERENCE TO RELATED APPLICATION

This application is a continuation of U.S. application Ser. No. 09/937,652, filed Sep. 27, 2001, now U.S. Pat. No. 6,835,490, issued Dec. 28, 2004, which application in turn is a 371 of PCT/JP99/06546, filed Nov. 24, 1999, and claims priority from Japanese Patent Application Serial No. 11/86866, filed Mar. 29, 1999.

TECHNICAL FIELD

The present invention relates to a method for absorption and release of hydrogen where a hydrogen storage metal alloy is repeatedly subjected to pressurization and depressurization of hydrogen. In more detail, the present invention relates to a hydrogen storage metal alloy having a two-stage plateau- or inclined plateau-property. Particularly, the present invention relates to a method for absorption and release of hydrogen where the amount of released hydrogen increases within practical pressure ranges and temperature ranges, to a hydrogen storage metal alloy suitable for such a method for absorption and release of hydrogen and to a hydrogen fuel battery using the above method for absorption and release of hydrogen.

RELATED ART OF THE INVENTION

At present, there have been worries not only about acid rain due to an increasing NOx (nitrogen oxides) but also about global warming due to an increasing $CO_2$ in association with an increase in consumption of fossil fuel such as petroleum and such environmental destruction has become a serious problem. Therefore, our attention has been greatly concentrated on development and practical application of various kinds of clean energy which is friendly to the earth. Part of means for developing such a new energy is a practical application of hydrogen energy. Hydrogen is a constituent element of water inexhaustibly present on the earth and can be not only produced using various kinds of primary energy but also utilized as fluid energy in place of conventionally used petroleum without the risk of destroying the environment because its product of combustion is only water. In addition, unlike electricity, it has excellent characteristics such as its relatively easy storage.

In recent years, therefore, investigation has been actively conducted involving hydrogen storage metal alloys as media for storing and transporting hydrogen and their practical application has been expected. Such hydrogen storage metal alloys are metals/alloys which can absorb and release the hydrogen under an appropriate condition and, by the use of such alloys, it is possible to store the hydrogen not only at lower pressure but also at higher density as compared to the case of the conventional hydrogen cylinders. In addition, the hydrogen volume density thereof is nearly equal to or rather greater than that of liquid or solid hydrogen.

These hydrogen storage metal alloys which have been chiefly investigated are, for example, those alloys which each have a body-centered cubic (hereinafter, referred to as "BCC") structure, including V, Nb, Ta or Cr—Ti—Mn alloys, Cr—Ti—V alloys, etc. as proposed in Japanese Unexamined Patent Publication (Kokai) No. 10-110225 (JP, A, 10-110225) It has been known that those alloys adsorb and store hydrogen in greater quantities as compared with ABs alloys such as $LaNi_5$ and $AB_2$ alloys such as $TiMn_2$ which have been practically used until now. This is because the number of hydrogen absorbing sites in the crystal lattice is great in the BCC structure and the hydrogen absorbing capacity is as large as H/M=ca. 2 wherein H is occluded hydrogen and M is a constituent element for the alloy (about 4.0 wt % in alloys of V, etc. having an atomic weight of around 50), being extremely large.

It has been known that such a BCC alloy having a relatively large hydrogen absorbing capacity conducts a two-step reaction during the course of its absorbing hydrogen to form a hydride, as shown in Reilly and R. H. Wiswall, Inorg. Chem., 9 (1970), 1678). For example, V reacts with hydrogen at ambient temperature and forms two kinds of hydrides depending upon the pressure of hydrogen. At first, at the initial reaction stage wherein hydrogen pressure is low, a very stable hydride is formed as $V \rightarrow VH_{0.8}$ ($\alpha$ phase$\rightarrow\beta$ phase) (hereinafter, referred to as "low-pressure plateau part") and, at around room temperature, a reverse reaction thereof rarely happens. When further more hydrogen pressure is applied, a hydride is formed as $VH_{0.8} \rightarrow VH_{2.01}$ ($\beta$ phase$\rightarrow\gamma$ phase; referred to as "high-pressure plateau part"). The equilibrium hydrogen pressure of this reaction is appropriate (approximately a few atmospheric pressure at around room temperature). Therefore, such V-containing BCC alloys have been briskly studied as high-capacity hydrogen storage metal alloys.

FIG. 1 is a conceptional chart of a PCT curve of a single substance V having a two-stage plateau comprised of the aforementioned low-plateau and high-plateau parts. The flat region at the hydrogen pressure of $10^{-1}$ Pa in FIG. 1 is a low-pressure plateau part and the flat region at the hydrogen pressure of $10^6$ Pa is a high-pressure plateau part. The inclined region between the low-pressure plateau part and the high-pressure plateau part is a region complying with Sieverts's law. Besides V, an example of the metal having such a two-stage plateau is Nb (low-pressure phase: NbH, high-pressure phase: $NbH_2$). In addition, Ti shows a two-stage plateau by a transformation of $\alpha \rightarrow \beta \rightarrow \gamma$ although it operates at elevated temperature. An intermetallic compound having a two-stage plateau includes FeTi which works at near 40° C. Further, alloys such as $(Zr, Ti)V_2$ show an inclined plateau and those alloys are also used as hydrogen storage metal alloys.

Examples of the prior art techniques presumably based upon the idea of developing a high-capacity hydrogen storage metal alloy relying on the above-mentioned two-stage plateau and inclined plateau characteristics are as follows:

(a) spinodal decomposition tissues are expressed in a body-centered cubic structure Ti alloy (the above JP, A, 10-110225);

(b) a Ti—Cr—V alloy is admixed with Cu and/or raree-arth elements (the above JP, B2, 4-77061);

(c) a Ti alloy melt is rapidly cooled to form a BCC mono phase at room temperature (Japanese Unexamined Patent Publication (Kokai) No. 10-158755 (JP, A, 10-158755)); and (d) a BCC alloy comprised as main elements of Ti—Cr is adjusted for its lattice constant (Japanese Unexamined Patent Publication (Kokai) No. 07-252560 (JP, A, 07-252560)).

Among the above-mentioned methods for absorbing and releasing hydrogen, those where temperature for absorption and desorption of hydrogen is mentioned are JP, A, 10-110225 and JP, A, 07-252560, both which disclose the methods where hydrogen is absorbed and released at a constant temperature, provided that, in the latter JP, A, 07-252560, the activating pretreatment is carried out by means of a two-stage treatment comprising a low temperature in the former stage and a high temperature in the latter stage while the temperature for hydrogen absorption and desorption is constant (20° C.). In Japanese Patent Publication No. 59/38293 (JP, B2, 59/38293), hydrogen is absorbed with a hexagonal Ti—Cr—V type alloy which is not a BCC alloy and a method of heating at 100° C. or higher (lines 32 to 39, column 4) is for absorbing and releasing hydrogen at a constant temperature as well.

However, in the hydrogen storage metal alloy having the above-mentioned two-stage plateau characteristic such as V-containing BCC alloy which has been often investigated as the high-capacity hydrogen storage metal alloy, the hydrogen-absorbing reaction at the low-pressure plateau region proceeds only to the side of the reaction with hydrogen at room temperature. Therefore, it has not been carried out in the prior art that the hydrogen occluded is taken out in such a low-pressure plateau region and used as an effective hydrogen.

Thus, in the above-mentioned JP, A, 10-110225 and JP, B2, 4-77061, such a low-pressure plateau region is not referred to. In the latter patent, since there is a teaching that the production of $TiH_2$ (high-pressure plateau region compound) is to be avoided, only the hydrogen-absorbing reaction between the low-pressure plateau region and the high-pressure plateau region is utilized.

It is said that, in general, the amount of hydrogen taken out from a body-centered cubic structure type hydrogen storage metal alloy such as pure V and pure Nb is very low as compared with the theoretical amount (Hydrogen Storage Metal Alloy—Physical Properties and Applications, New Edition, by Yasuaki Osumi, published by Agne Technique Center, Japan, first printing of the first edition issued on [Feb. 5, 1992, pages 340–341] Oct. 30, 1993, page 309).

In $AB_5$ alloys such as LaNis or BCC alloys, which have been practically utilized up to now, it is possible to control the equilibrium pressure regarding reaction with hydrogen by controlling the alloy components. It is also possible that the equilibrium pressure of the hydrogen storage metal alloy with hydrogen is controlled by the operating temperature. However, the conventional research on alloys as such is not particularly based on consciousness of improvement in the hydrogen-absorbing characteristic at the above-mentioned low-pressure plateau region.

Accordingly, it is believed that, in order to increase the hydrogen absorption capacity in the aforementioned BCC type hydrogen storage metal alloy, it is effective that the hydrogen in the reaction of α phase→β phase, i.e., the reaction at the low-pressure plateau part (for example, the reaction of V→$VH_{0.8}$ in the case of V), contributes to the reaction of absorption and desorption in addition to the β-phase region of the BCC type alloy (a portion complying with a Sieverts's law between a low-pressure plateau region and a high-pressure plateau region). However, such a means has not been disclosed yet.

Accordingly, an object of the present invention is, with regard to the conventional pure V or pure Nb showing a two-stage plateau or inclined plateau region or BCC solid solution alloys including not only solid solutions showing a hydrogen absorption/desorption reaction similar to the above-mentioned metal, but also Ti—Cr system alloys, etc., to provide a hydrogen storage metal alloy in which the hydrogen not only between α phase→β phase, i.e. in the reaction at the low-pressure plateau region but also at a low-pressure β phase region (a low-pressure region showing a behavior similar to a Sieverts's law between a low-pressure plateau region and a high-pressure plateau region) is made contributed in an absorption/desorption reaction of hydrogen in a reversible manner so that much more amounts of hydrogen can be absorbed and released and also to provide not only a method for absorbing and releasing hydrogen with the said alloy but also a hydrogen fuel battery using the said method.

SUMMARY OF THE INVENTION

In order to achieve the aforementioned objects, the present invention provides a novel hydrogen storage metal alloy. According to the present invention, the novel hydrogen storage metal alloy has the following characteristics:

(1) it has as its main phase a body-centered cubic structure-type phase exerting a two-stage or inclined plateau characteristic in a hydrogen storage amount vs hydrogen pressure relation, and (2) the composition ratio of constituent metals for the alloy is adjusted to an appropriate range in order to reduce the stability of the hydrogen occluded in the alloy during the low-pressure plateau region or the lower plateau region of the inclined plateau such that an alloy temperature (T2) during at least a period in a hydrogen release process can be brought to higher than an alloy temperature (T1) in a hydrogen-absorption process (T2>T1) whereby at least part of the occluded hydrogen will be made desorbable during the low-pressure plateau region in the above-mentioned two-stage plateau or the lower plateau region of the inclined plateau.

Such characteristics lead to the following:

the occluded hydrogen can be unstabilized in the alloy so that the alloy temperature may be brought to high (T2) during the hydrogen desorption process, thereby facilitating the release of hydrogen during the aforementioned low-pressure plateau region or the lower plateau region of the inclined plateau region, and therefore the occluded hydrogen at the low-pressure plateau region or the lower plateau region of the inclined plateau region, which has been neither desorbed nor utilized at all, can be taken out as utilizable hydrogen, with the result that the amount of the utilizable hydrogen in such a hydrogen storage metal alloy will be increased.

It is preferred that the hydrogen storage metal alloys of the present invention are those wherein the alloy temperature (T1) during the hydrogen-absorbing process may range from the extremely low temperature in the living areas on the earth to 373K.

As a result thereof, the alloy temperature (T1) during the hydrogen-absorbing process can be made near an ambient temperature region whereby the practicability can be improved.

It is preferred that the hydrogen storage metal alloys of the present invention are V alloys which each not only have a suitably adjusted composition to reduce the stability of the occluded hydrogen as aforementioned but also contain 0 to 95 at % of at least one or more members selected from the group consisting of Nb, Ta, W, Mo, Ti, Cr, Mn, Fe, Al, B, Co, Cu, Ge, Ni and Si.

As a result thereof, the alloys each having such a composition are highly effective in unstabilizing the occluded hydrogen therein and therefore suitable for releasing a large amount of hydrogen therefrom during the low-pressure plateau region or the lower plateau region of the inclined plateau by raising the alloy temperature during a hydrogen-desorbing process.

It is preferred that the hydrogen storage metal alloys of the present invention are those alloys which each have not only a suitably adjusted composition to reduce the stability of the occluded hydrogen as aforementioned but also a fundamental composition of the formula:

$$V_a Ti_{(41-0.4a+b)} Cr_{(59-0.6a-b)}$$

wherein $0 \leq a \leq 70$ at % and $-10 \leq b \leq 10$ at %.

As a result thereof, the alloys each having such a composition can occlude a large amount of hydrogen at the high-pressure plateau region and are greatly effective in unstabilizing the occluded hydrogen therein. Therefore, such alloys are preferable to release a large quantity of occluded hydrogen during the low-pressure plateau region or the lower plateau region of the inclined plateau by raising the alloy temperature during the hydrogen-desorbing process and have an effective amount of utilizable hydrogen in great quantities, thereby giving a high practicability.

It is preferred that the hydrogen storage metal alloys of the present invention are those alloys which each have not only a suitably adjusted composition to reduce the stability of the occluded hydrogen as aforementioned but also a fundamental composition of the formula:

$$V_{(a-d)} M2_d Ti_{(41-0.4a+b)} Cr_{(59-0.6a-b-c)} M_c$$

wherein $0 \leq a \leq 70$ at %, $-10 \leq b \leq 10+c$, $0 \leq c$, $0 \leq d \leq a$, M is at least one or more members selected from the group consisting of Nb, Mo, Ta, W, Mn, Fe, Al, B, C, Co, Cu, Ge, Ln (various lanthanoid metals), N, Ni, P and Si, and M2 is at least one or more members selected from the group consisting of Mo, Nb, Ta, W, Mn, Fe and Al.

As a result thereof, the alloys each having such a composition can occlude a large amount of hydrogen at the high-pressure plateau region and are greatly effective in unstabilizing the occluded hydrogen therein. Therefore, such alloys are preferable to release a large quantity of occluded hydrogen during the low-pressure plateau region or the lower plateau region of the inclined plateau by raising the alloy temperature during the hydrogen-desorbing process and have an effective amount of utilizable hydrogen in great quantities, thereby giving a high practicability. In addition, as a result of suitable admixture with at least one or more elements selected from the above-mentioned lanthanoid metals, N, Ni, P and Si, it is achievable to lower the melting point of the alloy and to improve the flatness of the plateau resulted thereby, and it is possible to either free the alloy of a heating treatment which is apt to cause a spinodal decomposition or shorten a heating treatment time, thereby leading to an effect that a decrease in the hydrogen storage amount can be suppressed.

It is preferred that the hydrogen storage metal alloys according to the present invention are those wherein the tissue structure of the above-mentioned suitably adjusted hydrogen storage metal alloy is of a body-centered cubic structure mono phase without any spinodal decomposition phase or has a body-centered cubic structure together with only a minimum spinodal decomposition phase which is unavoidably produced.

As a result thereof, the hydrogen storage metal alloy has a minimum spinodal decomposition phase or has no spinodal decomposition phase, thereby enabling a decrease in hydrogen adsorption capacity due to the formation of spinodal decomposition phase to be suppressed as little as possible.

A method for absorbing and releasing hydrogen by using the hydrogen storage metal alloy according to the present invention comprises:

applying repeatedly hydrogen pressurization and depressurization to the hydrogen storage metal alloy of a body-centered cubic structure-type phase exerting a two-stage or inclined plateau characteristic in a hydrogen storage amount vs hydrogen pressure relation in an appropriate fashion to absorb and release hydrogen, and at least at one stage during the release of hydrogen, making the temperature (T2) of the above-mentioned hydrogen storage metal alloy higher than the temperature (T1) of the hydrogen storage metal alloy during the hydrogen absorption process (T2>T1).

Such characteristics lead to the following: it is now possible to take out as a utilizable hydrogen the occluded hydrogen at the low-pressure plateau region or the lower plateau region of the inclined plateau which has not been desorbed and utilized at all whereby the amount of utilizable hydrogen can be increased in the hydrogen storage metal alloy.

It is preferred that the alloy temperature (T1) during the above hydrogen-absorbing process is within a range of from the extremely low temperature in the living areas on the earth to 373K in the method for absorbing and releasing hydrogen by using the hydrogen storage metal alloy according to the present invention.

As a result thereof, the alloy temperature (T1) during the hydrogen-absorbing process can be made near an ambient temperature region whereby the practicability can be improved.

It is preferred that the method for absorbing and releasing hydrogen according to the present invention comprises using a hydrogen storage metal alloy wherein the composition ratio of the constituent metals for the alloy is adjusted to an appropriate range in order to reduce the stability of the hydrogen occluded in the alloy during either the low-pressure plateau region or the lower plateau region of the inclined plateau such that the temperature of the said alloy can be brought to the above high temperature (T2) whereby at least part of the occluded hydrogen will be made desorbable during either the low-pressure plateau region in the above-mentioned two-stage plateau or the lower plateau region of the inclined plateau.

As a result thereof, the occluded hydrogen can be unstabilized in the alloy, thereby facilitating the release of hydrogen from either the above low-pressure plateau region or the lower plateau region of the inclined plateau when the temperature of the said alloy is made higher (T2) during the hydrogen release process, with the result that the amount of effective hydrogen can be increased.

It is preferred that the method for absorbing and releasing hydrogen according to the present invention comprises using a hydrogen storage metal alloy wherein the aforementioned adjustment is in such a manner that the composition ratio of the constituent metals for the alloy is adjusted suitably so as to reduce the stability of the occluded hydrogen in the alloy within either the low-pressure plateau region or the lower plateau region of the inclined plateau.

It is preferred that the method for absorbing and releasing hydrogen according to the present invention comprises using a hydrogen storage metal alloy with a suitably adjusted composition to reduce the stability of the above occluded hydrogen, said hydrogen storage metal alloy being a V alloy containing 0 to 95 at % of at least one or more members selected from the group consisting of Nb, Ta, W, Mo, Ti, Cr, Mn, Fe, Al, B, Co, Cu, Ge, Ni and Si.

As a result thereof, the alloy having such a composition is highly effective in unstabilizing the occluded hydrogen therein and therefore suitable for releasing a great deal of hydrogen from the low-pressure plateau region or the lower plateau region of the inclined plateau by raising the alloy temperature during the hydrogen release process.

It is preferred that the method for absorbing and releasing hydrogen according to the present invention comprises using a hydrogen storage metal alloy with a suitably adjusted composition to reduce the stability of the above occluded hydrogen, said hydrogen storage metal alloy having a fundamental composition of the formula:

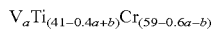

$$V_a Ti_{(41-0.4a+b)} Cr_{(59-0.6a-b)}$$

wherein $0 \leq a \leq 70$ at % and $-10 \leq b \leq 10$ at %.

As a result thereof, the alloy having such a composition has not only a great deal of occluded hydrogen therein at the high-pressure plateau region but also a high activity in unstabilizing the hydrogen occluded in the alloy. Therefore, such alloys are suitable for releasing a great deal of hydrogen from the low-pressure plateau region or the lower plateau region of inclined plateau by raising the alloy temperature during the hydrogen release process and highly practicable because a great amount of effective hydrogen is utilizable therein.

It is preferred that the method for absorbing and releasing hydrogen according to the present invention comprises using a hydrogen storage metal alloy with a suitably adjusted composition to reduce the stability of the above occluded hydrogen, said hydrogen storage metal alloy having a fundamental composition of the formula:

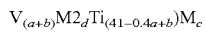

$$V_{(a+b)} M2_d Ti_{(41-0.4a+b)} M_c$$

wherein $0 \leq a \leq 70$ at %, $-10 \leq b \leq 10+c$, $0 \leq c$, $0 \leq d \leq a$, M is at least one or more members selected from the group consisting of Nb, Mo, Ta, W, Mn, Fe, Al, B, C, Co, Cu, Ge, Ln (various lanthanoid metals), N, Ni, P and Si, and M2 is at least one or more members selected from the group consisting of Mo, Nb, Ta, W, Fe and Al.

As a result thereof, the alloy having such a composition has not only a great deal of occluded hydrogen at the high-pressure plateau region but also a high activity in unstabilizing the hydrogen occluded in the alloy. Therefore, such alloys are suitable for releasing a great deal of hydrogen from the low-pressure plateau region or the lower plateau region of inclined plateau by raising the alloy temperature during the hydrogen release process and highly practicable because a great amount of effective hydrogen is utilizable therein.

In addition, the suitable admixture with at least one or more elements selected from the group consisting of the above-mentioned lanthanoid metals, N, Ni, P and Si leads to a decrease in the melting point of the alloy and an improvement in the flatness of the plateau resulted thereby whereupon the resultant alloy products are successful in suppressing a decrease in hydrogen adsorption capacity because a heating treatment which is apt to cause a spinodal decomposition is not applied or a treating time is shortened.

It is preferred that the method for absorbing and releasing hydrogen according to the present invention comprises using a hydrogen storage metal alloy wherein the tissue structure of the aforementioned suitably adjusted hydrogen storage metal alloy is of a body-centered cubic structure mono phase without any spinodal decomposition phase or has a body-centered cubic structure together with only a minimum spinodal decomposition phase which is unavoidably produced.

As a result thereof, the hydrogen storage metal alloy has a minimum spinodal decomposition phase or has no spinodal decomposition phase. Therefore, a reduction in the amount of occluded hydrogen by the formation of spinodal decomposition phase can be suppressed as little as possible.

The hydrogen fuel battery of the present invention is characterized in that the battery is equipped with a hydrogen storage tank including a hydrogen storage metal alloy, a temperature controlling means whereby the above hydrogen storage metal alloy is directly heated or cooled or the atmospheric temperature of the said hydrogen storage metal alloy is raised or cooled, a fuel battery cell in which hydrogen supplied from the said hydrogen storage tank can be subjected to a chemical change to output an electric power, and a controller where a control is done in such a manner that, with regard to the temperature (T1) of the above hydrogen storage metal alloy during the stage of hydrogen absorption, the temperature of the said alloy during at least one period during the release of hydrogen is made higher (T2) than the temperature (T1) thereof during the above hydrogen-absorbing process.

Such characteristics lead to the following: during the hydrogen release the temperature (T2) of the aforementioned hydrogen storage metal alloy can be made higher than the temperature (T1) during the hydrogen-absorbing process whereby it is now possible to take out as a utilizable hydrogen the occluded hydrogen at the low-pressure plateau region or at the lower plateau region of the inclined plateau, said occluded hydrogen which has been neither desorbed from the hydrogen storage metal alloy nor utilized before, and to increase electric energy obtained by the fuel battery cell.

For the hydrogen fuel battery of the present invention, it is preferred that the aforementioned controller is capable of appropriately controlling a pressure, temperature and flow rate of the hydrogen gas supplied from the above-mentioned hydrogen storage tank to the above-mentioned fuel battery cell.

As a result thereof, the pressure, temperature and flow rate of hydrogen gas can be controlled whereby it is possible to control amounts of generated electric energy in the fuel battery cell appropriately depending upon the load and to enhance the utilizing efficiency of the hydrogen used in the said fuel battery cell.

For the hydrogen fuel battery of the present invention, it is preferred that the above-mentioned temperature controlling means is arranged so as to enable the heat discharged from the above-mentioned fuel battery cell or the exhaust gas discharged from the said fuel battery cell to be utilized for the above-mentioned heating.

As a result thereof, the discharged heat or the exhausted heat of the fuel battery cell can be utilized for raising the temperature of the above-mentioned hydrogen storage metal alloy whereby no electric energy or the like is necessary for raising the temperature of such a hydrogen storage metal alloy and the efficiency throughout the hydrogen fuel battery can be enhanced.

BRIEF DESCRIPTION OF THE DRAWINGS

FIG. 4 is a graph showing a hydrogen absorption characteristic (313 K) of $V_x$—$Ti_{(40-0.4x)}$—$Cr_{(60-0.6x)}$ cast alloy.

FIG. 7 is a graph showing a hydrogen absorption and desorption characteristic when the measuring temperature is 303K and 323K in a $V_{70}Zr_{0.5}Ti_{11.5}Cr_{18}$ alloy.

FIG. 8 is a graph (conceptional diagram) showing an influence of the temperature difference in a PCT curve having a two-stage plateau.

FIG. 12 is a graph showing a hydrogen absorption-desorption characteristic obtained by conducting the fourth and the fifth cycles after the absorption-desorption cycle conducted in FIG. 11.

BEST MODE FOR CARRYING OUT THE INVENTION

Figure 1:
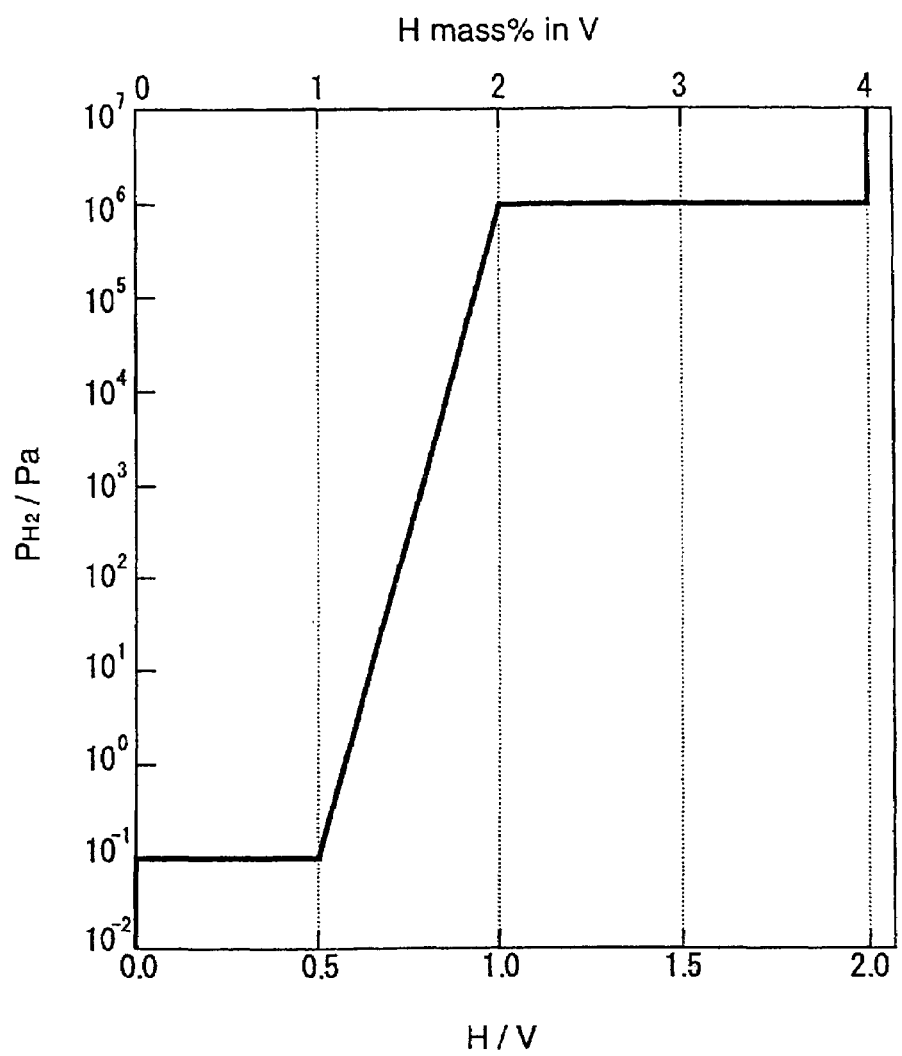
FIG. 1 is a conceptional diagram of a PCT curve of metal V.

As hereunder, the present invention will be illustrated by referring to the drawings.

First, the reason why the composition of the alloy according to the present invention is defined as above is that a reaction of V→$VH_{0.8}$ (α→β phase) in pure V is very stable and it is difficult to dissociate hydrogen from $VH_{0.8}$ under a practical condition but, when it is kept in vacuo at 673K (300° C.) for example, it is possible to dehydrogenate it. In the inventive alloy wherein V is greatly substituted with Ti and Cr, stability of $V(M)H_{0.8}$ ("V(M)" refers to a solid solution of V) is lowered whereby hydrogen is made easily dissociated even at the relatively low practical temperature. Although the alloy of the present invention is in a composition where a spinodal decomposition is apt to take place, it is concluded to be allowed within an extent of being unavoidably formed because, as will be mentioned later in detail, a spinodal decomposition tissue is a source of deterioration of a hydrogen absorption characteristic.

Then the reason for selecting the compositions of the alloy according to the present invention will be explained. Thus, V is capable of forming a BCC mono phase within a composition range of 5 to 100 at %. Further, Ti and Cr are the elements which lower the stability of $VH_{0.8}$ when made into an alloy with V. The atomic radius of Ti (1.47 Å) is bigger than that of V (1.34 Å) and that of Cr (1.30 Å). Therefore, when V is substituted with Ti and Cr and an amount of substituent Ti is more than that of substituent Cr, a lattice constant of the BCC main phase becomes big whereby a plateau pressure of a PCT curve lowers. In the alloy of the present invention, V is greatly substituted with Ti and Cr so as to lessen the stability of $V(M)H_{0.8}$ formed at the above-mentioned lower pressure plateau is lowered, thereby aiming at increasing an amount of released hydrogen from the said alloy. However, the hydrogen dissociation pressure at the high-pressure plateau region is to be kept within a practical range and, for such a purpose, the substitution ratio of Ti and Cr in the substitution with Ti and Cr as mentioned above comes to an important factor.

The starting composition in the present invention is $V_{70}Ti_{12}Cr_{18}$ (figures are in atomic %). This alloy is a substance derived from pure V by substituting 30 at % of V with 12 at % of Ti and 18 at % of Cr; in other words, wherein 30 at % of V has been replaced therewith at a ratio of Ti:Cr=4:6. When the total amount of V was replaced therewith at a ratio of Ti:Cr=4:6, an alloy of $Ti_{40}Cr_{60}$ was produced. In order to suitably adjust pressure conditions, a fundamental composition of the formula:

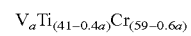

$$V_aTi_{(41-0.4a)}Cr_{(59-0.6a)}$$

wherein a is an atomic % of V in the alloy, is derived for the composition wherein V is 0 at % in a $Ti_{41}Cr_{59}$ alloy and the range of a falls within 0≦a≦70 at %.

FIG. 4 shows a hydrogen absorption characteristic of a $V_x$—$Ti_{(40-0.4x)}$—$Cr_{(60-0.6x)}$ cast alloy at 313K (40° C.). It is understood that the alloy wherein the level of V has been made less than 80 at % shows a good characteristic.

In order to allow the dissociation pressure of the alloy to take an appropriate range (in other words, to adjust it depending upon the operating temperature), the term b is set to give an extent for the selection of alloy components so as to enable the dissociation pressure to be adjusted to some extent and −10≦b≦10 at % is basic.

Figure 5:
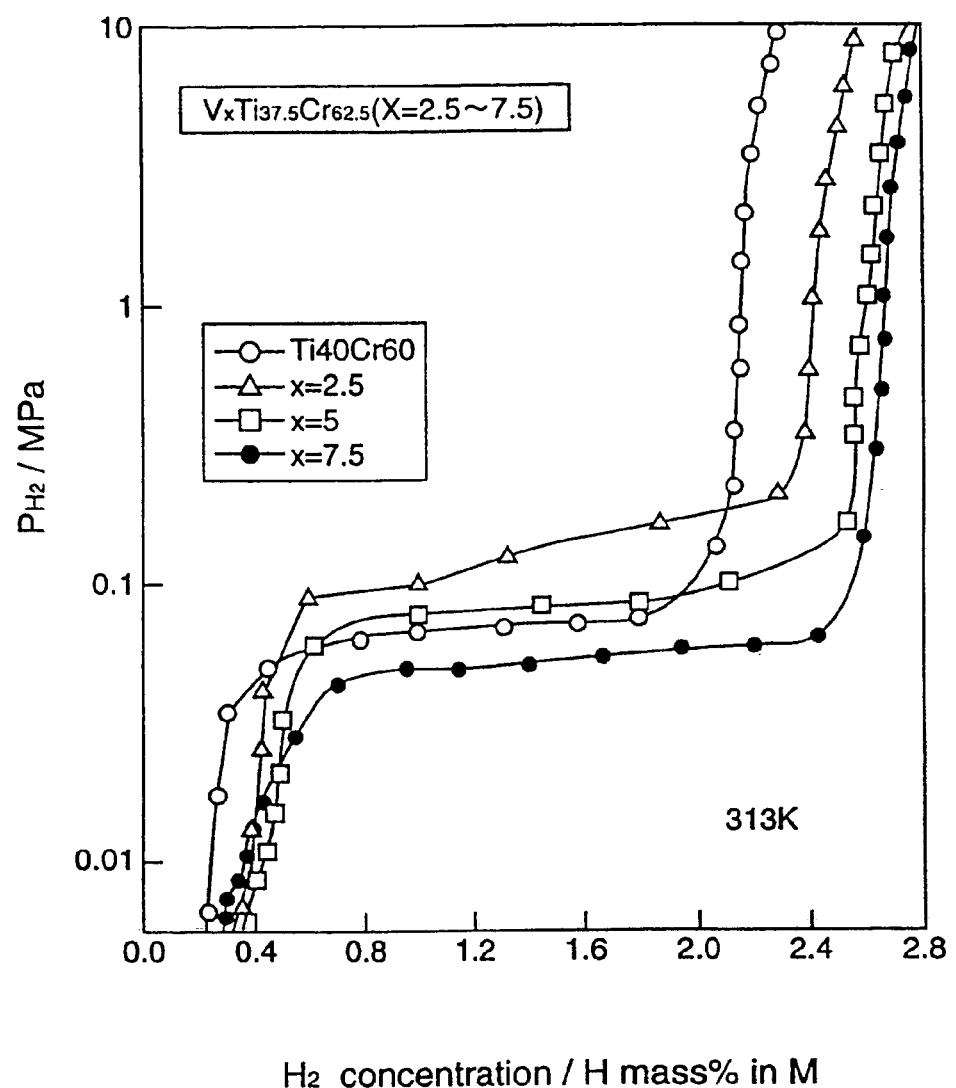
FIG. 5 is a graph showing a hydrogen absorption characteristic under the ordinary cycle in a heat-treated $V_x$—$Ti_{37.5}$—$Cr_{(62.5-x)}$ alloy.

FIG. 5 shows a hydrogen absorption characteristic (the third cycle) at 313K (40° C.) of the heat-treated alloy which was produced by subjecting a

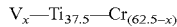

alloy (x=0 to 7.5) to a heating treatment for 1 hour at 1673K (1400° C.). It is understood from the drawing that its hydrogen absorption capacity comes to as high as 2.8 mass % when a BCC structure is present by application of a heating treatment even when the level of V in the alloy is as small as 5 to 7.5 atomic %.

Further, in case the Cr component among the alloy components is substituted with other components, when the substituent is M in the alloy and the amount of substituents is c–at %, the basic formula is

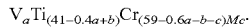

Since there is a tendency that a dissociation pressure increases by a component M, a condition for b is introduced to be −10≦b≦10+c−at %. This alloy may also be subjected to a hydrogen absorption/desorption at a predetermined temperature like in the conventional case. Although only about one-half of theoretical amount of hydrogen can be taken out in the case of the conventional alloys, there is an advantage in the alloy of the present invention that a great increase in hydrogen desorption capacity is achieved.

As shown in FIG. 5, it is understood that the BCC type V—Ti—Cr system alloy containing a micro amount of V has a high hydrogen storage capacity. It has been known that the element which is apt to form a BCC structure with Ti and Cr, like V, is Mo, Nb, Ta, W, Fe or Al. To aim at a BCC type structure by substituting part of V with such an element is believed to be effective from a phase diagram (the component capable of accelerating the BCC formation will be hereinafter referred to as an M2 term). In case where the V term among the alloy components is replaced with the above M2 term, an amount of the substituent M2 is defined as d−at % (0≦d≦a) wherein the M2 component may also be utilized as the above-mentioned substituent term for Cr, i.e., the M term.

The hydrogen storage metal alloy according to the present invention provided as such is characterized in that the alloy is a hydrogen storage V type metal alloy having a two-stage plateau characteristic, and has a composition of the following formula:

$$V_{(a-d)}M2_dTi_{(41-0.4a+b)}Cr_{(59-0.6a-b-c)}M_c$$

wherein 0≦a≦70 at %, −10≦b≦10+c, 0≦c, 0≦d≦a, M is at least one or more elements selected from the group consisting of Nb, Mo, Ta, W, Mn, Fe, Al, B, C, Co, Cu, Ge, Ln (various lanthanoid metals), N, Ni, P and Si, and M2 is at least one or more elements selected from the group consisting of Mo, Nb, Ta, W, Mn, Fe and Al, and the main phase of the alloy is in a body-centered cubic structure and do not have a spinodal decomposition tissue or has a spinodal decomposition phase which is unavoidably produced.

The method of the present invention is a method for effectively utilizing the occluded hydrogen in a low-pressure plateau region of hydrogen storage metal alloy showing a two-stage plateau or inclined plateau characteristic which comprises:

absorbing hydrogen at a low temperature region (T1), elevating a temperature during a hydrogen release process, and increasing a hydrogen dissociation pressure of the low-pressure plateau region at an elevated temperature region (T2>T1) whereby the hydrogen at the low-pressure plateau region is released.

The lowest limit in the above low-temperature region (T1) is an extremely low temperature in a living area where hydrogen can be utilized as an energy source and, at present, 243K is an example of such an extremely low temperature. The above elevated temperature region (T2) is a temperature which is higher than the above low-temperature region (T1) which is the hydrogen-absorbing temperature. The above elevated temperature region (T2) can be achieved by the use of a waste heat (usually about 70 to 100° C.) generated at the fuel battery member upon operation (i.e., corresponding to the hydrogen release process) or a heat from a heater exclusively therefor when the hydrogen storage metal alloy is used, for example, as a tank for a fuel battery.

Although the method for absorbing and releasing hydrogen according to the present invention is applicable to various kinds of a body-centered cubic type hydrogen storage metal alloy, it is preferably applicable to V alloys, particularly, to hydrogen storage V metal alloys containing each 0 to 95 at % of at least one or more elements selected from the group consisting of Ti, Cr, Nb, Mo, Ta, W, Mn, Fe, Al, B, C, Co, Cu, Ge, Ln (various lanthanoid metals), N, Ni, P and Si.

More preferably, when a method for absorbing and releasing hydrogen which comprises absorbing hydrogen with an alloy wherein the stability of $VH_{0.8}$ (or $V(M)H_{0.8}$, i.e., a low-pressure plateau region) is lowered, and releasing hydrogen at an elevated temperature on a final hydrogen release stage, is applied, it is possible to absorb and desorb a much greater deal of hydrogen. With regard to a hydrogen release cycle, the desorption may be carried out at the temperature which is same as that at hydrogen-absorption (the low temperature which has been mentioned until now; T1) during a part of the period but, at least in the final stage of desorption, it is necessary to adjust to the above-mentioned high temperature (T2) by means of heating so that hydrogen is sufficiently desorbed. Preferably, hydrogen at the above high-pressure plateau part is desorbed at a relatively low temperature (which may be the same temperature as the above-mentioned T1) and, for taking out the hydrogen from the above-mentioned low-temperature plateau part at the final stage of the desorption of hydrogen, the alloy is heated to make the temperature high as mentioned above (T2) and to desorb the hydrogen.

As hereunder, the inventive effects of the method for absorbing and releasing hydrogen according to the present invention will be more specifically illustrated by citing the experiments conducted by the present inventors. Unless otherwise mentioned, the alloys used as samples were prepared in such a manner that the materials were weighed so as to bring the weight of ingot to 14 g, arc-melted in an argon atmosphere of 40 kPa and dissolved and stirred repeatedly three times for enhancing the uniformity and the resulting cast ingots per se were used as samples or subjected to a heating treatment for homogenization at 1473K for 2 hours in an Ar atmosphere.

Figure 6:
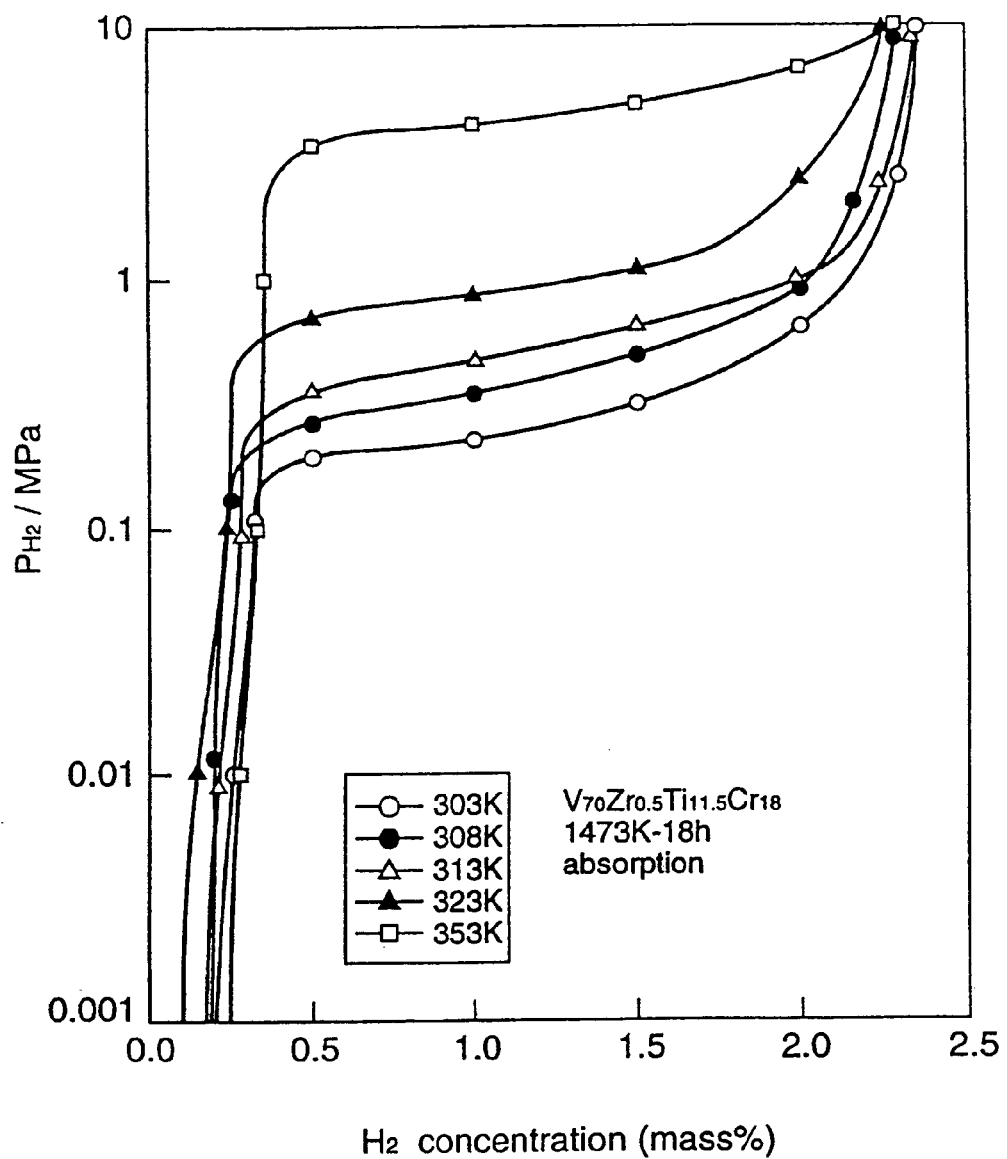
FIG. 6 is a graph showing an influence of the measuring temperature on a hydrogen absorption characteristic in a $V_{70}Zr_{0.5}Ti_{11.5}Cr_{18}$ alloy.

First, a measurement was carried out for 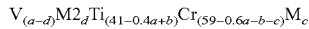 alloys wherein an large amount of V was contained, which have been briskly studied at present. Before the measurement, a full deaeration was carried out at the measuring temperature and then hydrogen absorption characteristics were examined at a given measuring temperature. The results are shown in FIG. 6 (pressure vs composition isothermal curve: PCT line chart). It is understood from FIG. 6 that the lower the measuring temperature, the lower the plateau pressure and the more the hydrogen storage amount.

Figure 2:
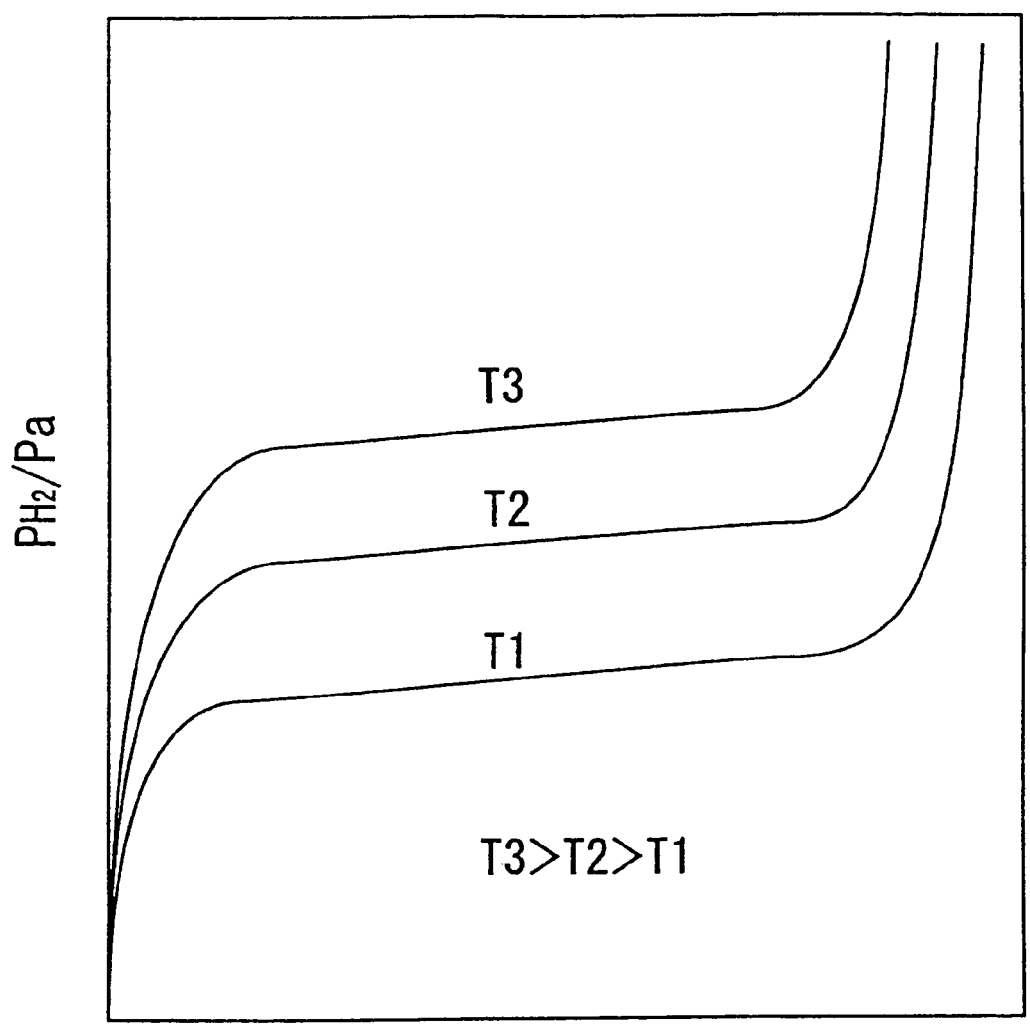
FIG. 2 is a graph showing a typical relation between a hydrogen absorption-dissociation curve and temperature in $LaNi_5$, etc.

The results of the measurement at 303K (30° C.) and 323K (50° C.) for hydrogen absorption and desorption characteristics of the above $V_{70}Zr_{0.5}Ti_{11.5}Cr_{18}$ alloy are shown in FIG. 7. When the hydrogen release characteristics at 303K and 323K are compared, it is noted that a greater amount of hydrogen can be released when the operation is carried out at the elevated temperature of 323K. When the results of FIG. 6 and FIG. 7 are summarized together, it has been noted that a much greater amount of hydrogen can be absorbed and released if hydrogen is absorbed at low temperature and hydrogen is desorbed at high temperature. Unlike the conventional hydrogen storage metal alloy having a one-stage plateau (refer to FIG. 2), the hydrogen storage metal alloy having a two-stage plateau region does not show a clear decrease in amounts of absorbed and desorbed hydrogen even when operated at high temperature because the low-pressure plateau region or the inclined plateau region contributes to absorption and desorption of hydrogen when operation is carried out at high temperature as noted from the results as shown in FIG. 7, i.e., the hydrogen storage metal alloy begins to utilize a low-pressure plateau region.

Figure 3:
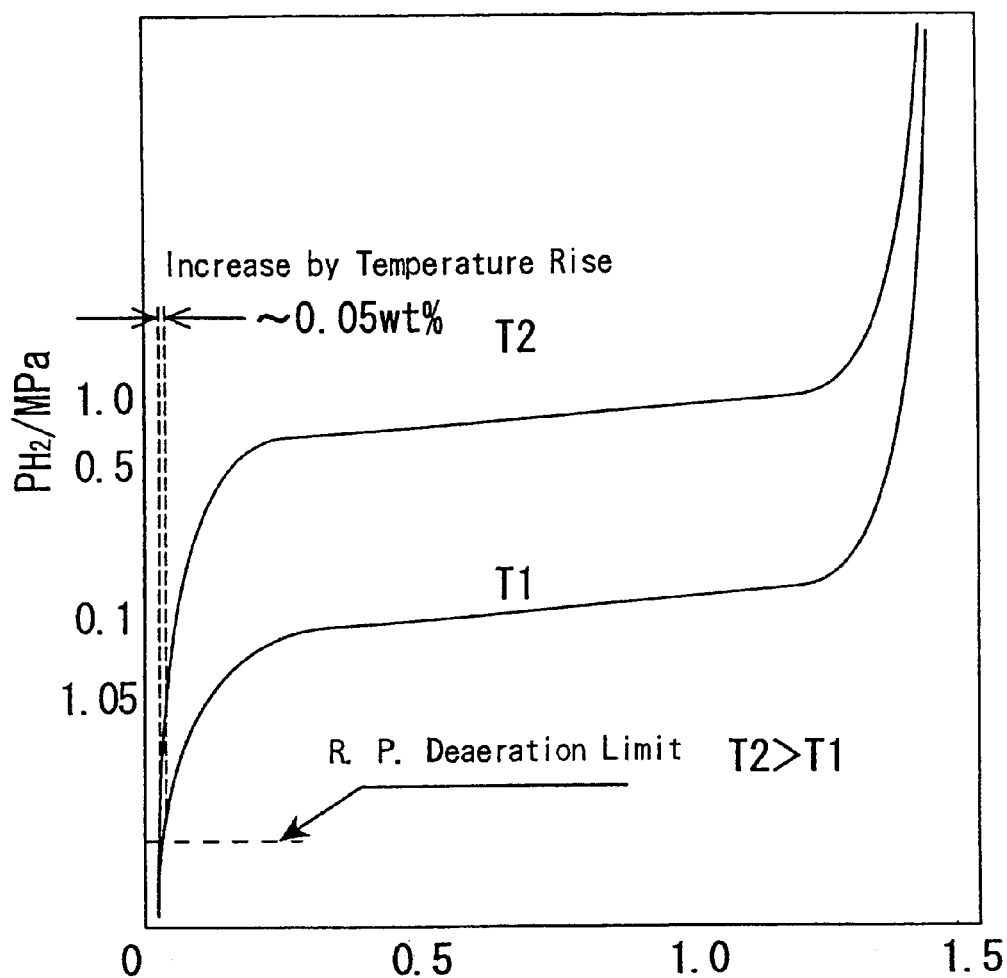
FIG. 3 is a graph showing amounts of released hydrogen depending on the rise in the temperature upon hydrogen release in $LaNi_5$, etc.

When the PCT curves (FIG. 2 and FIG. 3) of the hydrogen storage metal alloy having a one-stage plateau mentioned in the paragraphs of Related Art of the Invention are checked once again, an increase in a hydrogen release curve by making the temperature high rarely occurs in the case of a one-stage plateau alloy. Therefore, it is understood that elevation of the operation temperature in the hydrogen release process is quite effective for an increase in the amount of released hydrogen with regard to the hydrogen storage metal alloy having a two-stage plateau or an inclined plateau region.

Figure 9:
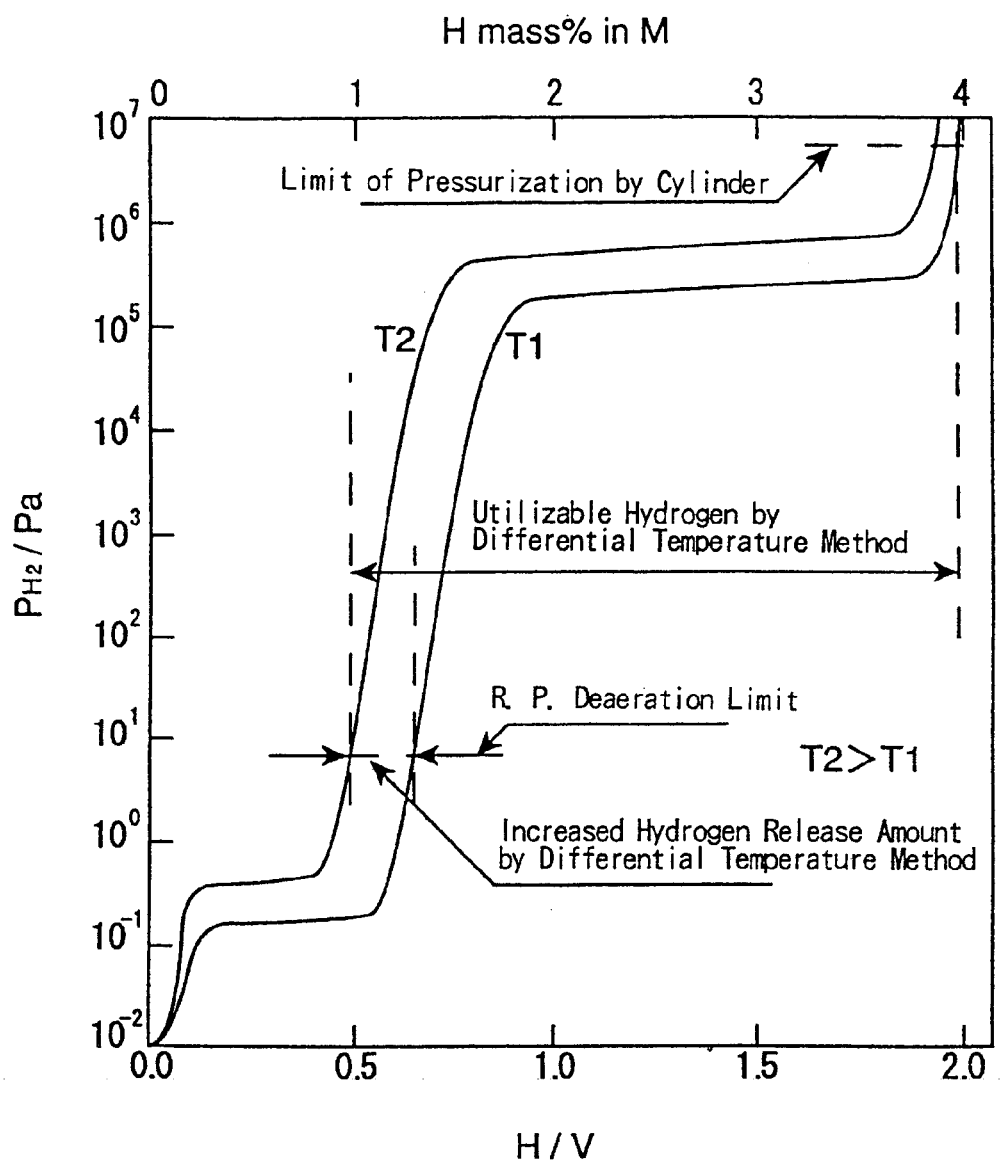
FIG. 9 is a graph (conceptional diagram) showing a volume increase of the temperature difference in a PCT curve having a two-stage plateau.
Figure 10:
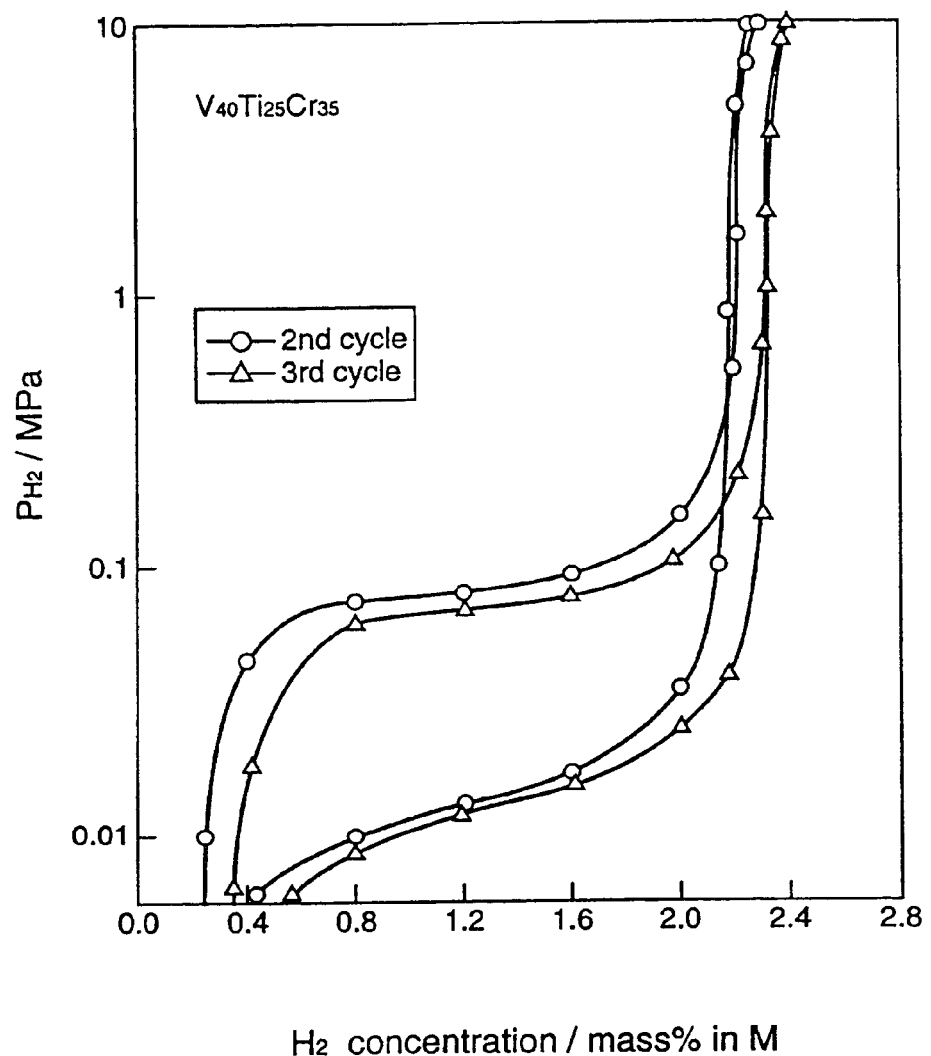
FIG. 10 is a graph showing the hydrogen absorption-desorption characteristic obtained by conducting an ordinary absorption-desorption cycle (the second cycle) and a cycle according to the method of the present invention (the third cycle) for a $V_{40}Ti_{25}Cr_{35}$ alloy.
Figure 11:
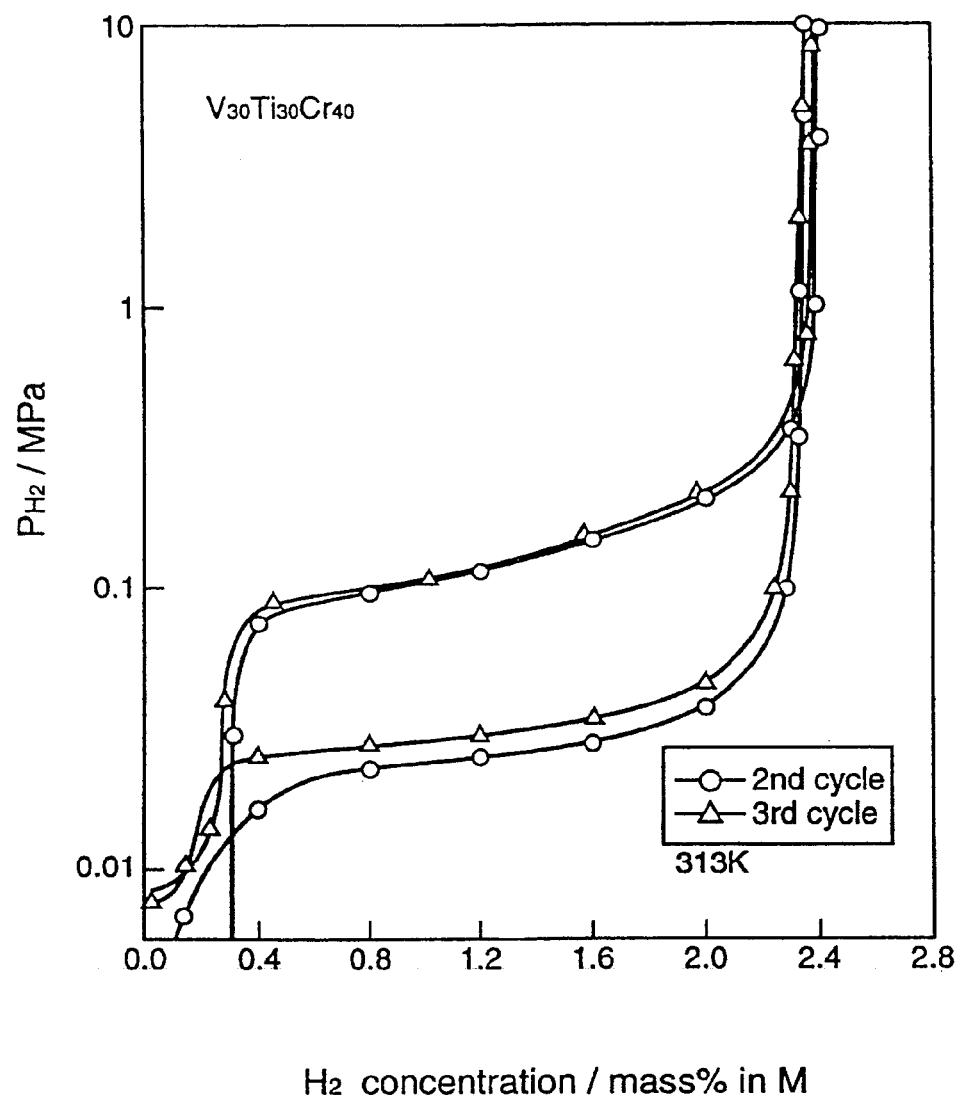
FIG. 11 is a graph showing a hydrogen absorption-desorption characteristic when the measuring temperature is 313K in a $V_{30}Ti_{30}Cr_{40}$ alloy.

Now, based upon the experimental results of FIG. 6 and FIG. 7 and by referring to the PCT curve (conceptional chart) of V metal shown in FIG. 1, a conceptional chart depicting an influence of the temperature difference in the PCT curve having a two-stage plateau has been prepared and is shown as FIG. 8. An increase in the amount of desorbed hydrogen is noted in the $V_{70}Zr_{0.5}Ti_{11.5}Cr_{18}$ alloy which has been examined. Then, a comparison has been made for the cases when operations were carried out at a low temperature T1 and a high temperature T2. Although there is nearly no difference in the amounts of absorbed and desorbed hydrogen between the two, it is likely that there occurs a big difference in the amounts of the residual hydrogen in the alloy. Now, when hydrogen was absorbed at low temperature T1 and released at higher temperature T2 than T1 (in other words, a differential temperature method was applied), a conceptional chart is shown in FIG. 9 which shows an increase in the hydrogen capacity. Unlike the conventional hydrogen storage metal alloy having a single plateau region, it is understood from FIG. 9 that it is possible to increase the amounts of absorbed and released hydrogen in the case of a hydrogen storage metal alloy having a two-stage plateau when such an alloy can be suitably designed and adjusted and a temperature may be elevated mostly at the taking stage of hydrogen release process so as to lead to an increase in the operation temperature with regard to the hydrogen storage metal alloy having an inclined plateau whereby a site related to a low-pressure plateau can be contributed to the hydrogen absorption/release. According to a principle which is different from the hydrogen storage metal alloy having a one-stage plateau alloy, the present inventors have found a possibility that an increase in amounts of released hydrogen can be achieved or a high capacity can be acquired for hydrogen storage metal alloy-equipped hydrogen tanks.

However, it has been well known as already mentioned in the above the paragraphs of Related Art of the Invention that it is impossible to increase an amount of released hydrogen (i.e., to take out a sufficient amount of hydrogen from the low-pressure plateau region) by heating up to about 100° C. An increase in the hydrogen storage amount by a differential temperature method has not been investigated yet. Thus, it can be concluded that the $V_{70}Zr_{0.5}Ti_{11.5}Cr_{18}$ alloy of the present invention is capable of achieving an increase in the hydrogen release amount with elevating the temperature during the desorption stage, relying on a new principle different from the conventional V alloy. The fact that such a conclusion can be applied to known V alloys having different compositions has been confirmed as follows:

The $V_{40}Ti_{25}Cr_{35}$ alloy which was reported in the aforementioned JP, A, 10-110225 (having a spinodal decomposition tissue as a result of a heat-treatment at 1473K for 2 hours) was subjected to an activating treatment followed by measurement for the first cycle and the second cycle at 313K (40° C.), and further subjected to a deaeration at room temperature for 5 hours or more, and then at 368K (95° C.) for 3 hours followed by measurement for the third cycle at 313K. The PCT curves at the second cycle and the third cycle are shown in FIG. 9. In the second cycle wherein a usual hydrogen absorption/desorption process was carried out, the amount of hydrogen which could be reversibly taken out therefrom was about 2.4 mass % which was in the same degree as that in the conventional report while in the third cycle wherein an elevated temperature process was introduced into the second cycle which was at the same low temperature as in the conventional case the amount of occluded hydrogen slightly increased to 2.49 mass %.

Based upon these results, it is difficult to increase an amount of stored hydrogen by a hydrogen desorption reaction from $V(M)H_{0.8}$ with regard to a BCC type alloy containing about 40 at % of V. However, when a high-temperature cycle is carried out after the low-temperature cycle, the amount of occluded hydrogen increases. The efficacy of the alloy operation method per se according to the present invention has been confirmed. Therefore, it is concluded that the amount of occluded hydrogen will increase if an improvement is carried out for the composition.

A $V_{30}Cr_{30}Ti_{40}$ alloy (having a spinodal decomposition tissue similarly to the alloy of FIG. 6) wherein the amount of V was further reduced as an alloy with an optimum composition to which the above cycle for effectively utilizing hydrogen was applicable was measured for PCT curve up to 3 cycles at the constant temperature of 313K. The results are shown in FIG. 1. The hydrogen storage amount obtained as a result thereof is in a similar degree with one reported already.

Next, in order to confirm the effectiveness of the method according to the present invention, a PCT curve measured at 313K after deaeration at 368K for 2 hours as the fourth cycle and a PCT curve measured after deaeration at 363K for 5 hours as the fifth cycle are shown in FIG. 12. It is confirmed that the amount of occluded hydrogen increases from 2.45 mass % to 2.8 mass % when the method of the present invention is applied. The important thing here is that an increase in the amount of occluded hydrogen is observed and the hydrogen absorption capacity amounts up to about 2.8 mass % for the $V_{30}Cr_{30}Ti_{40}$ alloy in spite of the fact that the $V_{30}Cr_{30}Ti_{40}$ alloy is not deaerated at room temperature and the desorption time is shorter than in the case of the aforementioned $V_{40}Ti_{25}Cr_{35}$ alloy (being deaerated at room temperature before deaeration at high temperature). Therefore, according to the method of the present invention for absorbing and releasing hydrogen, it is possible to take out the hydrogen more efficiently from the low-pressure region as compared with the conventional operation at the constant temperature whereby it is noted that an effectively utilizable amount of occluded hydrogen can be significantly increased.

Figure 13:
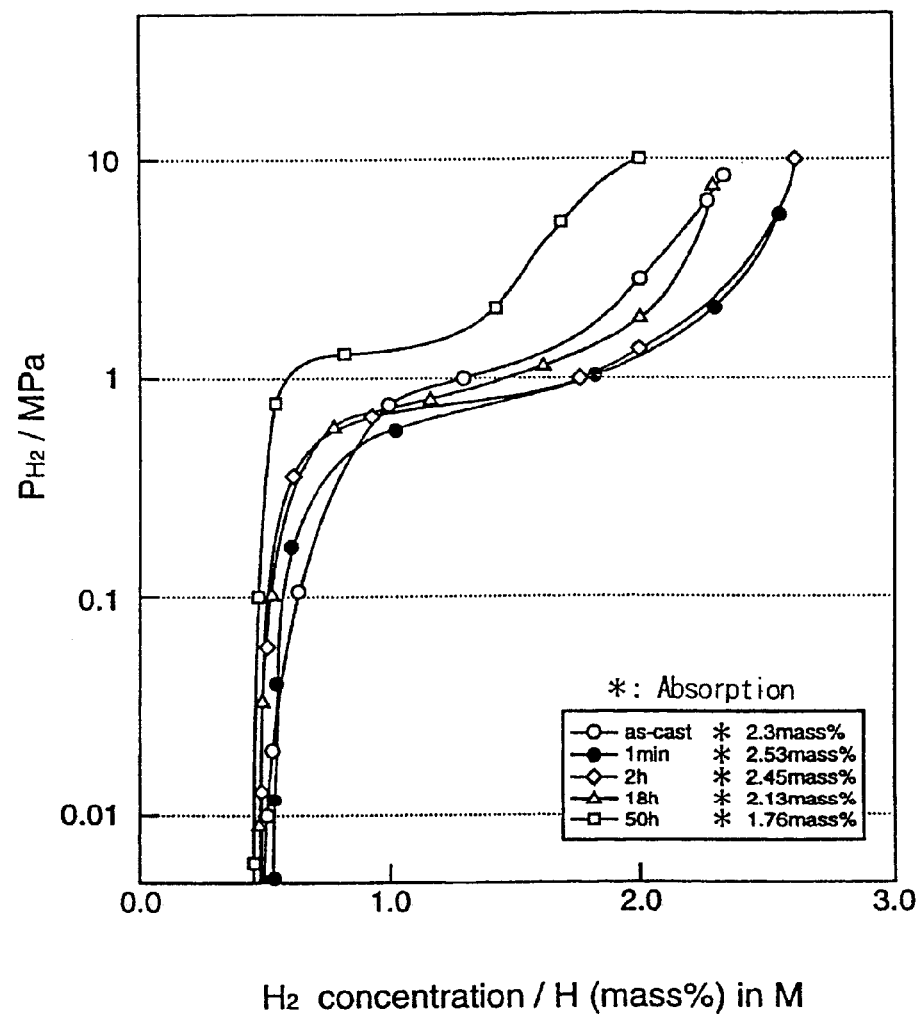
FIG. 13 is a graph showing a hydrogen absorption characteristic in the third cycle of a $V_{35}Ti_{25}Cr_{40}$ alloy subjected to a heating treatment at 1573K for a given time.

FIG. 13 shows a PCT absorption curve each of as cast and as heat-treated at 1573K for various retention time ranges $V_{35}Ti_{25}Cr_{40}$ alloys. The results show that the hydrogen-absorption characteristic is better in the case where a heating treatment is not carried out at all or where the time for a heating treatment is as short as possible than the alloy which is fully in the form of a spinodal decomposition. Based upon such a finding, it is decided to permit the tissue of the alloys according to the present invention so far as it is in a BCC mono phase without any spinodal decomposition phase or with only a spinodal decomposition phase unavoidably produced. The phrase "unavoidably produced" as used herein refers to shorter than 2 minutes which is slightly longer than -●- in FIG. 13 and, when the time is as short as such, the alloy may be kept within a spinodal decomposition range. In the meanwhile, it will be apparent from the above illustration that, when the method of the present invention is applied to the alloy where the heating time is 2 to 50 hours in FIG. 13, the corresponding increase in the hydrogen storage amount can be achieved.

It will be also apparent that, since the low-temperature plateau region of the hydrogen storage metal alloy showing the two-stage plateau as mentioned above can be effectively utilized, the method of the present invention is applied to an alloy showing an inclined plateau whereby the low-temperature region can be effectively utilized for hydrogen absorption.

Figure 14:
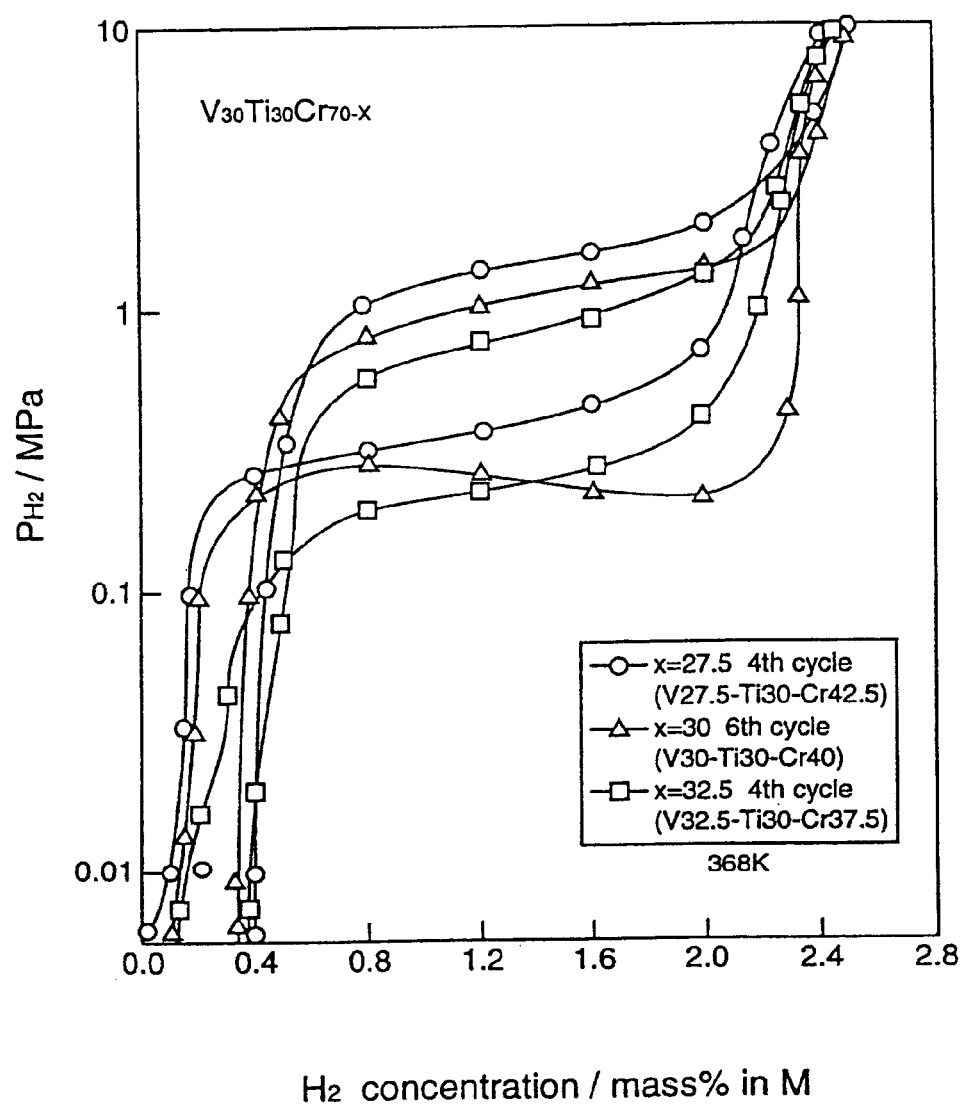
FIG. 14 is a graph showing hydrogen absorption characteristics at 368K of a $V_xTi_{30}Cr_{(70-x)}$ alloy (X=27.5, 30, or 32.5).

Then, a PCT curve measured at 368K for a $V_xTi_{30}Cr_{(70-x)}$ alloy wherein the amount of V was varied is shown in FIG. 14. From the results of FIG. 14, it is noted that, at this temperature, hydrogen absorption took place up to 2.65 mass % and all of the occluded hydrogen, especially in the case of a $V_{27.5}Ti_{30}Cr_{42.5}$ alloy, was desorbed. In the conventional alloy, only about one-half of the theoretical amount of hydrogen can be taken out; however, when hydrogen is taken out at 368K, the conclusion is that all of the occluded hydrogen in the sample can be effectively utilized.

Figure 15:
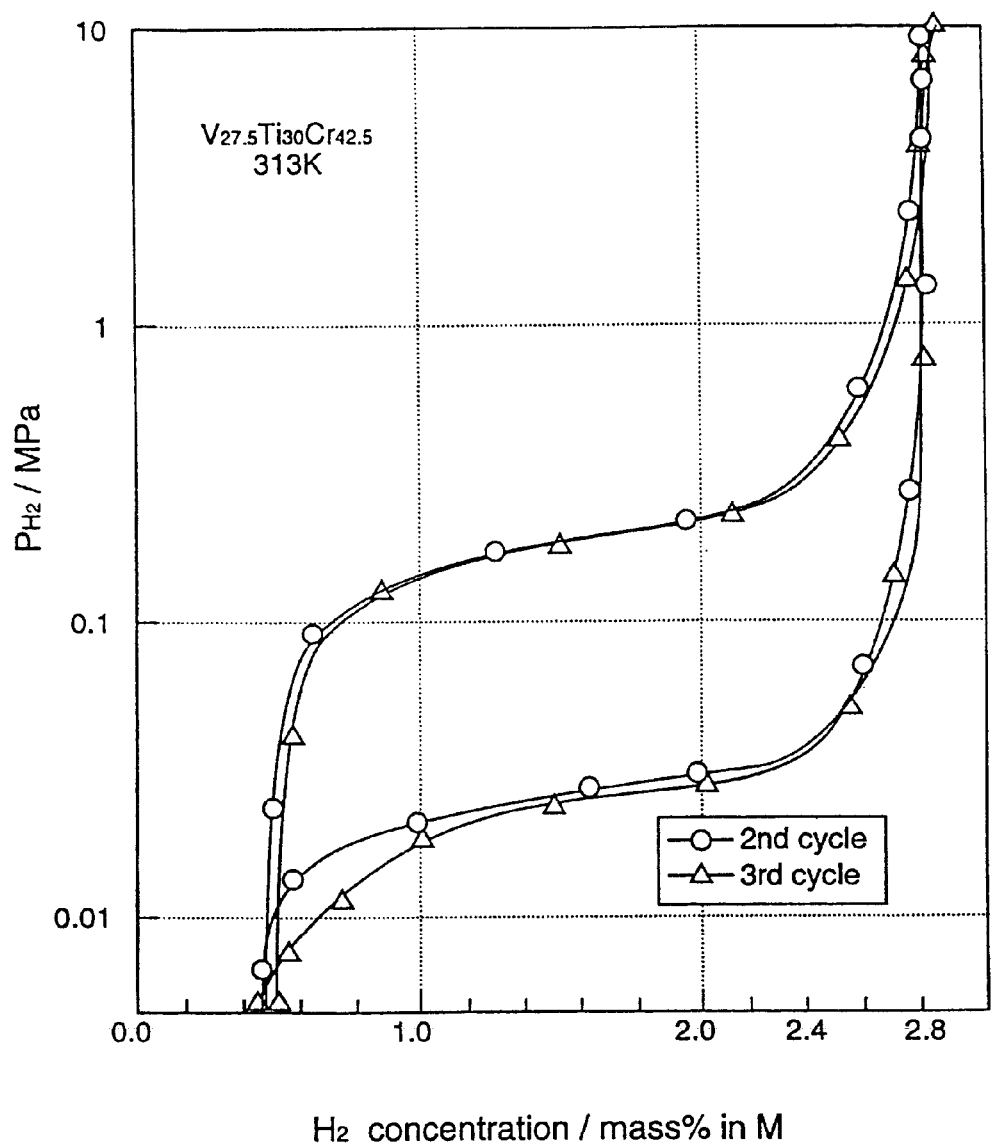
FIG. 15 is a graph showing a hydrogen absorption characteristic at 313K of a $V_{27.5}Ti_{30}Cr_{42.5}$ alloy.
Figure 16:
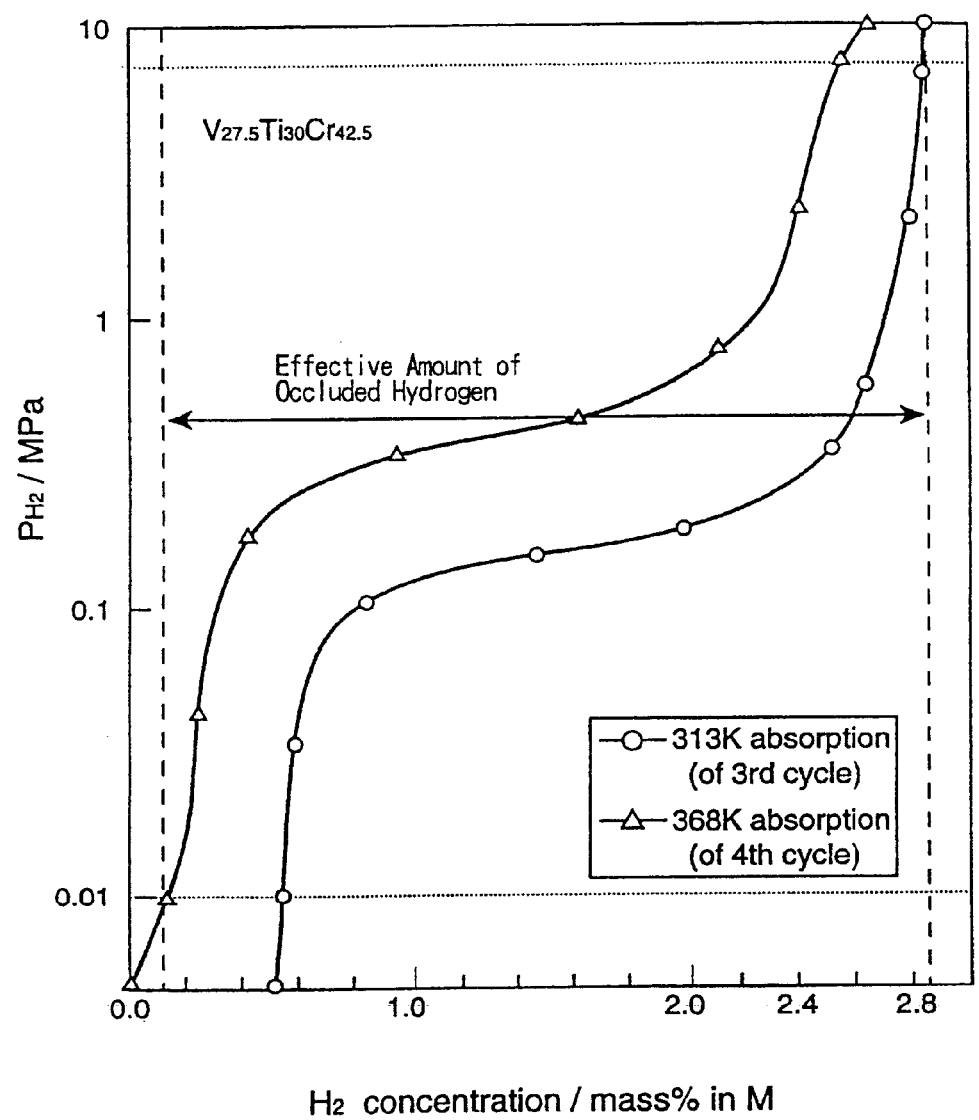
FIG. 16 is a graph showing an effective hydrogen absorption characteristic when the method of the present invention is applied to a $V_{27.5}Ti_{30}Cr_{42.5}$ alloy.

The results when the method of the present invention was applied to this sample are shown in FIG. 15. Thus, the first cycle was carried out at the constant temperature in the same manner as in the conventional case, then a deaeration was carried out at 368K in each of the second and third cycles before measurement and the measurement was carried out at 313K where upon the amount of occluded hydrogen increased up to 2.8 mass %. Accordingly, when hydrogen is absorbed with a $V_{27.5}Ti_{30}Cr_{42.5}$ alloy at 313K and desorbed at 368K, the hydrogen can be utilized to the maximum extent. The results are shown in FIG. 16. The effectively utilized hydrogen amount is the difference between the hydrogen storage amount at 7 Mpa in the hydrogen-absorbing process at 313K and the residual hydrogen amount in the alloy at 0.01 MPa in the hydrogen release process at 368K. Accordingly, it is 2.7 mass %.

Figure 17:
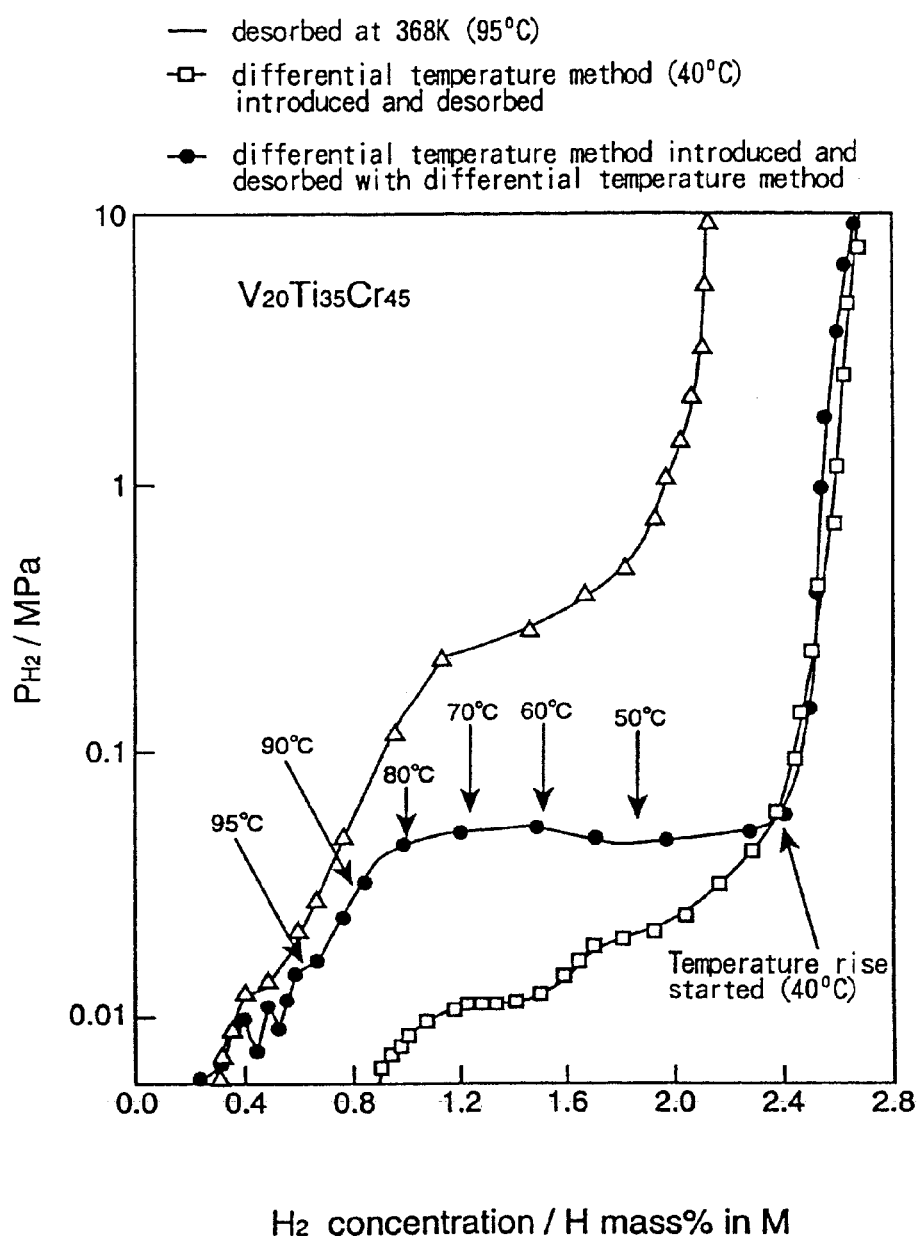
FIG. 17 is a graph showing a conceptional proof (upon hydrogen release; raised from 313K to 368K, and dissociation pressure controlled) of the differential temperature method using a $V_{20}Ti_{35}Cr_{45}$ sample.

Similarly, the results of the present invention applied to a melt-prepared $V_{20}Ti_{35}Cr_{45}$ alloy are shown in FIG. 17.

In the drawing, there are shown PCT curves in the hydrogen release process for (1) the case (Δ) where hydrogen absorption and desorption was carried out at 368K (90° C.), (2) a cycle (□) wherein a differential temperature method was introduced in such a manner that hydrogen desorption was carried out at 368K and thereafter hydrogen absorption and desorption was carried out at 313K (40° C.), and (3) a cycle (●) where hydrogen desorption was carried out at 368K, hydrogen absorption was carried out at 313K and, during the hydrogen release process, heating was carried out up to 368K with monitoring the dissociation pressure after hydrogen desorbing to an equilibrium hydrogen dissociation pressure of 0.05 MPa.

The curve shown by □ is the case where hydrogen desorption was carried out at 368K and then hydrogen absorption was carried out at 313K showing a big storage amount. Accordingly, it is noted that the differential temperature method is effective.

The curve shown by ● is the case where the operating temperature was elevated when the equilibrium dissociation pressure during the hydrogen release process arrived 0.05 MPa (temperature for each stage is mentioned in the drawing) and, as a result of heating, the dissociation pressure was controlled, the plateau region was flattened and the effective amount of hydrogen was greatly increased. It is noted from the drawing that the residual hydrogen amount in the alloy at 0.005 MPa is identical with that in the desorption curve (Δ) obtained at 368K.

Thus, it is noted that, when a differential temperature method is used, the amount of occluded hydrogen increases and, if the temperature is elevated during the hydrogen desorption, the effectively utilizable hydrogen amount increases.

Figure 18:
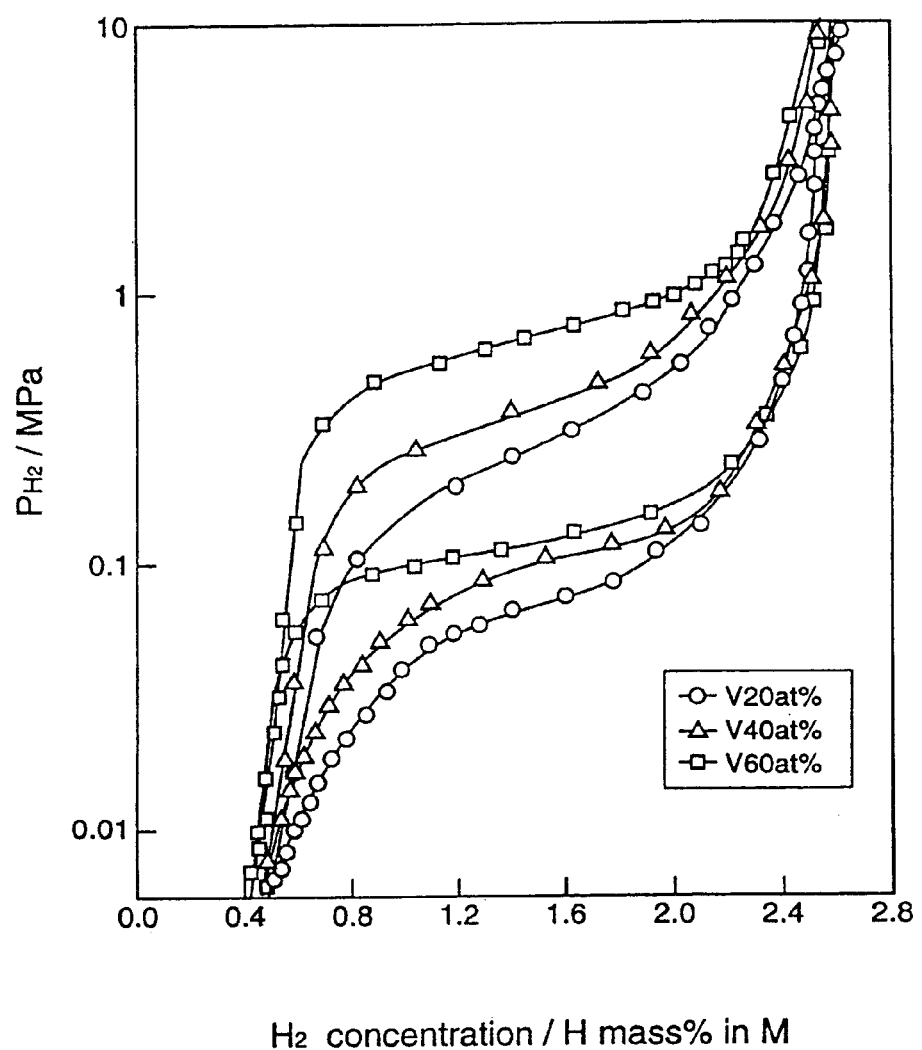
FIG. 18 is a graph showing a hydrogen absorption characteristic when the alloy working method of the present invention is applied to a $V_x$—$Ti_{(40-0.4x)}$—$Cr_{(60-0.6x)}$ cast alloy which is an alloy according to the present invention.

Then, the results when the alloy operating method of the present invention, i.e., the differential temperature method, was applied to a $V_x-Ti_{(40-0.4x)}-Cr_{(60-0.6x)}$ cast alloy are shown in FIG. 18. As shown herein the alloy wherein the level of V is brought to from 20 to 60 at % exerts the hydrogen storage capacity of about 2.85 to 2.95 mass %. When this is compared with FIG. 4, it is noted that, when the method of the present invention is applied, an increase in a hydrogen capacity to an extent of about 0.2 to 0.3 mass % is confirmed whereby the effectiveness and usefulness of the present invention are noted.

Figure 19:
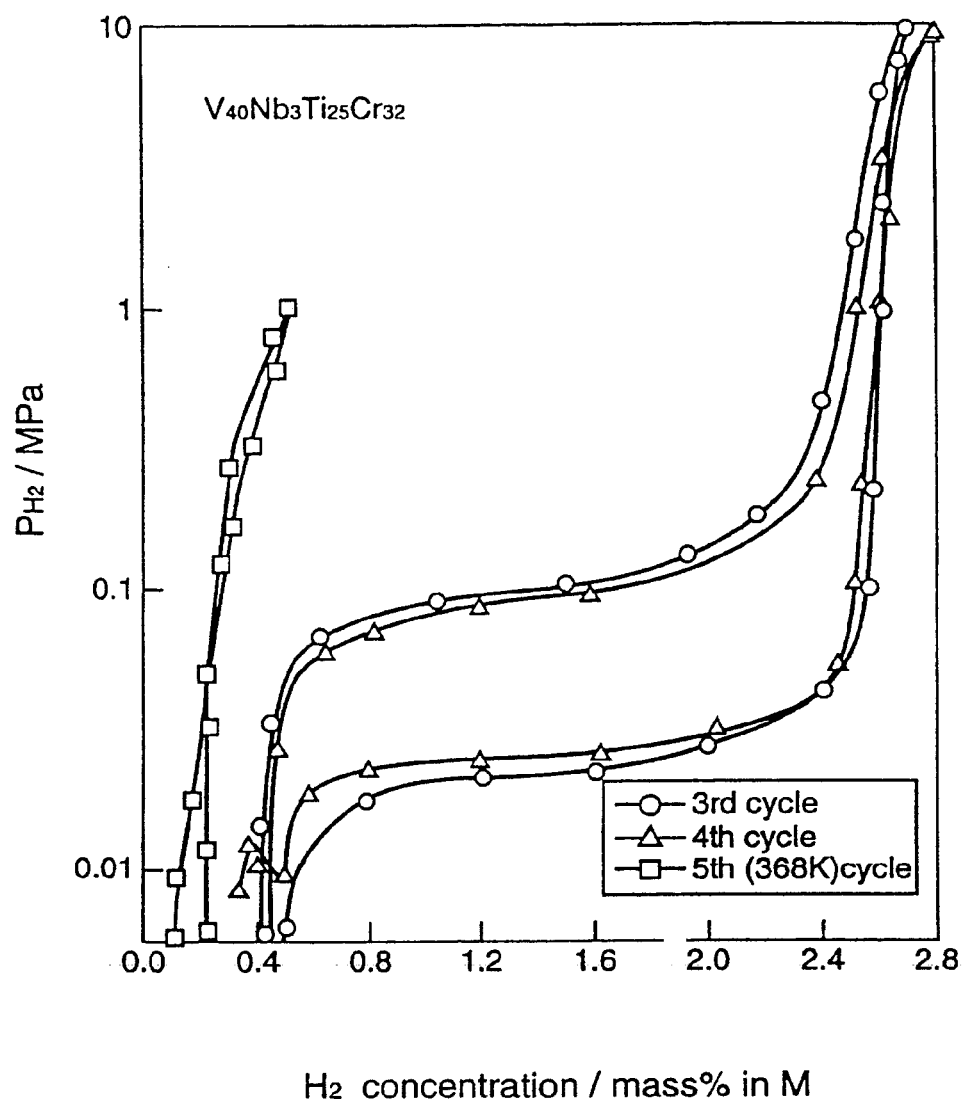
FIG. 19 is a hydrogen absorption characteristic graph showing an influence of a temperature rise on dissociation pressure in a $V_{40}Nb_3Ti_{25}Cr_{32}$ alloy.

Further, as mentioned already, when a $V_{40}Ti_{25}Cr_{35}$ alloy which was reported to occlude about 2.4 mass % of hydrogen was subjected to an absorption/desorption treatment by the present invention, a hydrogen storage amount increased up to 2.49 mass %. The results where it was partially substituted with Nb having a strong tendency of forming a BCC solid solution are also shown in FIG. 15 while PCT curves of a $V_{40}Ti_{25}Cr_{35}Nb_3$ alloy as measured at the third and the fourth cycles and at 368K are shown in FIG. 19. From the results, it is believed that hydrogen storage amounts increased by substitution with Nb and a dissociation pressure of the low-pressure plateau region increased when the temperature was raised to 368K. The effectively utilizable hydrogen amount is 2.7 mass %. It is noted that, as such, the hydrogen storage amount increases and the utilizable effective hydrogen amount increases by the method of the present invention even in the known alloys by substituting with Nb.

Figure 20:
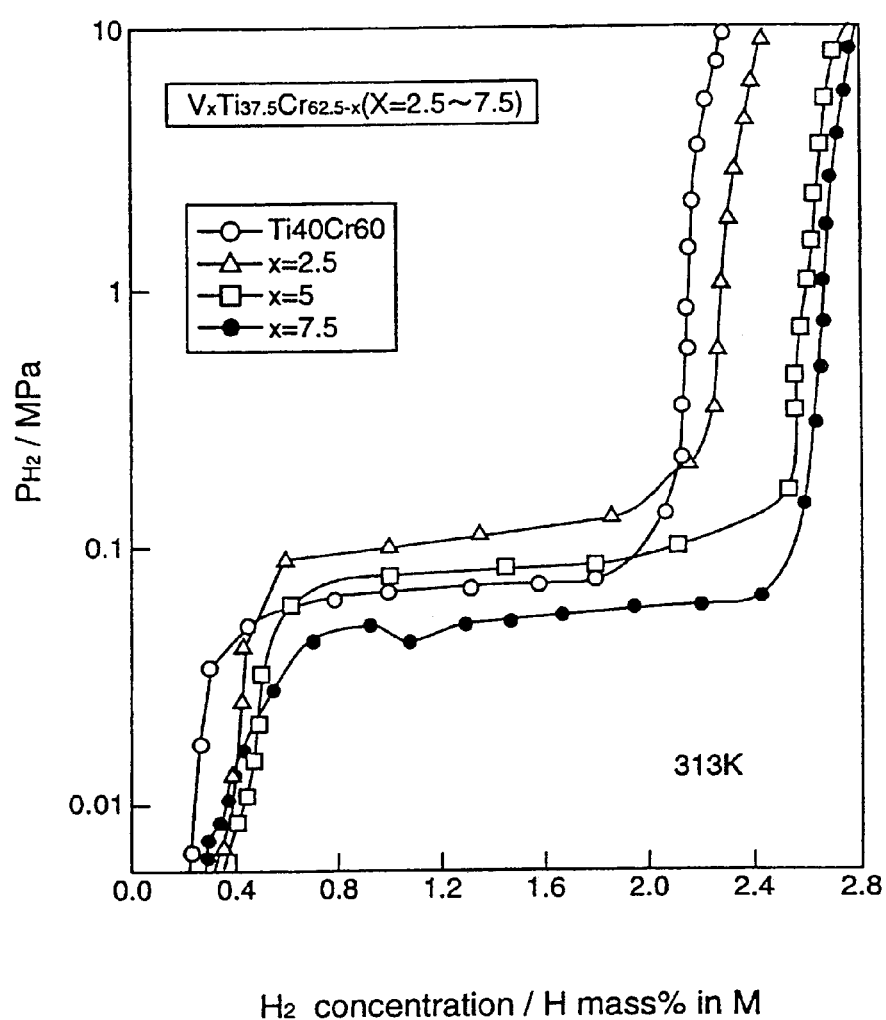
FIG. 20 is a graph showing a hydrogen absorption characteristic when the differential temperature method of the present invention is applied to a heat-treated $V_x$—$Ti_{37.5}$—$Cr_{(62.5-x)}$ alloy.

FIG. 20 shows the results when the differential temperature method of the present invention was applied to a heat-treated $V_x-Ti_{37.5}-Cr_{(62.5-x)}$ alloy exerting the hydrogen storage amount of as high as 2.8 mass % (refer to FIG. 5). Even in the alloys where the level of V is brought to as small as 5 to 7.5 atom %, a hydrogen storage amount of about 3.0 mass % is achieved when the present invention is applied. When a comparison is made with the results of FIG. 5 (absorption/desorption at the single temperature of 313K in the same fashion as in the conventional method), an increase of about 0.2 mass % in the hydrogen capacity is noted upon application of the present invention whereby the effectiveness and usefulness of the present invention are noted. Especially in the case which is shown hereinabove, only the results are shown within such a temperature range where the utilization of waste heat is easy but it is also possible to form a high capacity hydrogen storage metal alloy tank in a different manner when a heating apparatus is installed in the hydrogen storage metal alloy tank either auxiliary or positively and a heating is carried out at the final stage of the hydrogen release process.

As an example of the present invention, there is shown a case where hydrogen was occluded at 313K (40° C.) and desorbed at 368K (95° C.). When the hydrogen-absorbing process is carried out at lower temperature and the hydrogen desorption process is carried out at higher temperature, however, the effective amount of utilizable hydrogen further increases.

As mentioned hereinabove, when the hydrogen storage metal alloy of the present invention and the method for absorbing and releasing hydrogen using the said hydrogen storage metal alloy are used, a good increase in the hydrogen storage amount can be achieved even if the temperature difference between absorption and desorption of hydrogen is 40 to 100° C. which can be easily realized. Thus, by using a hydrogen storage metal alloy tank to which such a hydrogen storage metal alloy and a hydrogen absorption/desorption method are applied, a hydrogen fuel battery with a high efficiency and a high capacity will be illustrated as hereunder.

Figure 21:
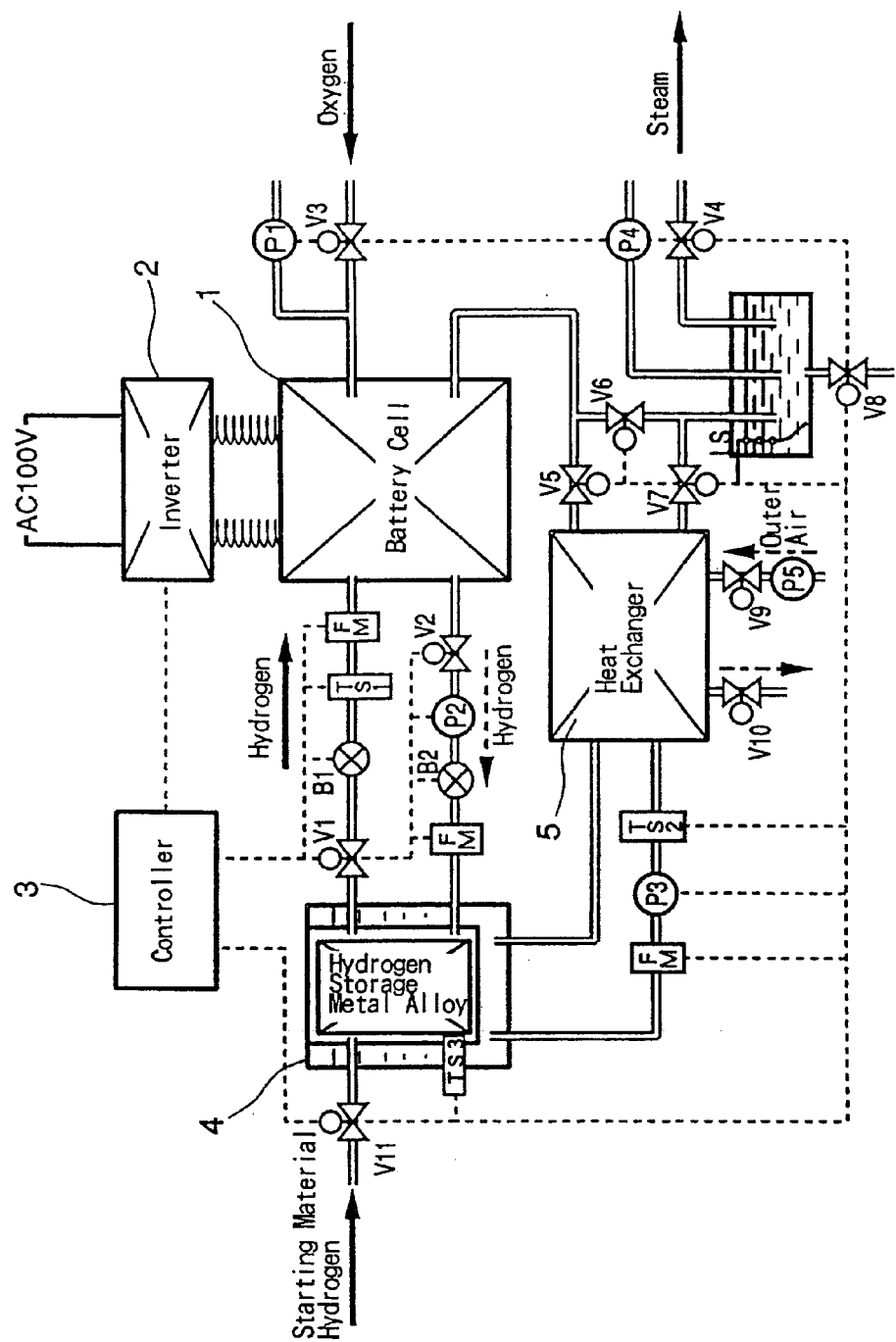
FIG. 21 is a system flow chart showing an embodiment of the hydrogen fuel battery according to the present invention.
Figure 22:
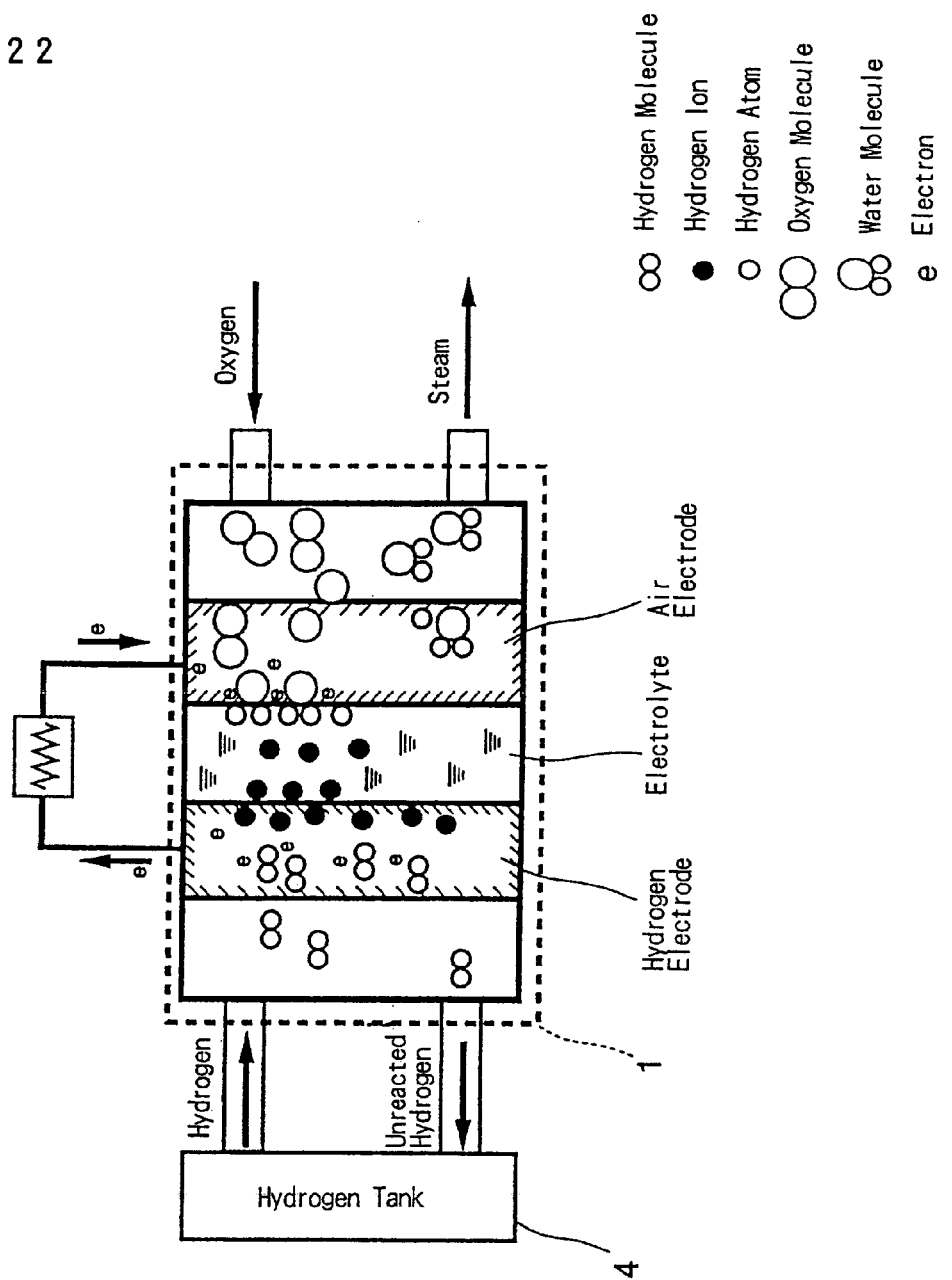
FIG. 22 is a schematic chart showing a mechanism of generation of electric power in the fuel battery cell used in the hydrogen fuel battery of the present invention.

FIG. 21 is a system flow chart showing a preferred embodiment of the hydrogen fuel battery according to the present invention. FIG. 22 is a schematic chart showing a mechanism of generation of electric power in the fuel battery cell used in the hydrogen fuel battery of the present invention.

The constitution of the hydrogen fuel battery in the above embodiment is as shown in FIG. 21. The battery is mainly constituted from a hydrogen fuel tank (4) installed with a hydrogen storage metal alloy in which the composition of constituent elements is suitably adjusted so as to make the occluded hydrogen desorbable in the low-pressure plateau region by means of heating according to the present invention, said fuel tank (4) being capable of supplying the hydrogen occluded in the said hydrogen storage metal alloy to a fuel battery cell (1) which will be Mentioned Later;

the said fuel battery cell (1) in which hydrogen supplied from the said hydrogen fuel tank (4) is used as a fuel and the said hydrogen is made to react with oxygen to change to water whereby the electric power can be taken out while water is decomposed upon application of electric power on the contrary whereby the hydrogen can be supplied to the aforementioned hydrogen fuel tank (4);

an inverter (2) in which a direct current electric power output from the said fuel battery cell (1) is converted to a predetermined alternating current electric power;

a heat exchanger (5) in which a heat exchange is carried out between the outer air as well as the discharged heat existing in a steam of relatively high temperature discharged from the said fuel battery cell (1) and the cold/warm water as a cooling/warming medium circulated in a cooling/warming medium jacket installed at the outer circumference of the said hydrogen fuel tank (4); and a controller (3) for conducting various control for elevating or lowering the temperature of the hydrogen storage metal alloy in the said hydrogen fuel tank (4), mass control for pressure, flow rate, temperature, etc. with regard to hydrogen supplied to the said fuel battery cell (1) and control for each of the above-mentioned members.

The said controller (3) is connected to pumps (P1 to P5), electromagnetic valves (V1 to V11, pressure valves (B1, B2), a flowmeter (FM) and temperature sensors (TS1 to TS3) installed on various piping as shown by broken lines in FIG. 21. LS in the drawing is a water level sensor in a storage tank in which water produced is stored upon cooling the steam discharged from the fuel battery cell (1) by a heat exchanger (5).

As hereunder, the operation of the hydrogen fuel battery according to the present embodiment will be illustrated. At first, a step of hydrogen absorption with the hydrogen storage metal alloy in the above-mentioned hydrogen fuel tank (4) will be illustrated.

Firstly, the hydrogen which is to be absorbed with the hydrogen storage metal alloy is supplied, as a starting material hydrogen (shown in FIG. 21), into the hydrogen fuel tank (4) by connecting a high-pressure hydrogen cylinder to a hydrogen supplying outlet followed by opening the valve (V1) whereupon the hydrogen storage metal alloy absorbs the hydrogen from the low-pressure plateau region to the high-pressure plateau region.

Simultaneously, the above-mentioned controller (3) releases the valves (V9 and V10) connected to the heat exchanger (5) and also makes the pump (P5) in an operating state whereby the outer air is sent into the heat exchanger (5) to cool the above-mentioned cold/warm water with the outer air. At the same time, the hydrogen storage metal alloy is monitored for the temperature with the above-mentioned temperature sensor (TS3) and the circulation pump (P3) is appropriately operated so as to bring the temperature (T1) of the said hydrogen storage metal alloy to 40° C. or lower whereby the above heat-exchanged cold/warm water is appropriately passed into the above-mentioned cooling/warming medium jacket to carry out the cooling of the hydrogen storage metal alloy. When the predetermined amount of hydrogen is absorbed, the above-mentioned valve (V11) is closed and hydrogen absorption is finished.

When the fuel battery is operated to obtain the electric power after such a hydrogen absorption is finished, the above-mentioned controller (3) opens the valve (V1), appropriately operates the above-mentioned pressure valve (B1) based upon the detection data from the flowmeter (FM), pressure sensor (PM) and temperature sensor (TS1) installed to the downstream of the pressure valve (B1) so as to adjust a pressure and flow rate of hydrogen to be supplied to the fuel battery cell (1) from the hydrogen fuel tank (4) to a predetermined pressure, and controls the temperature of hydrogen to be supplied with appropriately passing the above-mentioned cold/warm water through the above-mentioned cooling/warming medium jacket. Simultaneously, the controller (3) operates the pump (P1) so that the oxygen in the outer air is sent into the above-mentioned fuel battery cell (1).

Each operation of the members including the controller (3) before generating electric power by the fuel battery cell can be carried out by means of a storage battery (not shown)

installed in the said hydrogen fuel battery. As a result of supplying the hydrogen and the oxygen (outer air) to the fuel battery cell (1) as above, direct current is obtained in the said fuel battery cell (1), as shown in FIG. 22, with the reaction which is reverse to the production of hydrogen and oxygen via electrolysis of water by application of direct current to water to which an electrolyte has been added. Therefore, hydrogen molecules supplied from the hydrogen fuel tank (4) become hydrogen ions by releasing electrons at a hydrogen electrode and the resulting electrons move to a positive electrode side whereupon electric power is generated.

Such hydrogen ions move to the positive electrode side in an electrolyte, receive electrons at the positive electrode to return to hydrogen atoms and simultaneously react with oxygen contained in the above-mentioned supplied outer air to form water (steam). With regard to an exhaust gas containing the steam of relatively high temperature (around 70 to 90° C.) due to heat liberated in the exothermic reaction to water, when the heat of the exhaust gas is utilized to heat the above-mentioned cold/warm water, the said controller (3) opens the valves (V5, V7) (naturally, the valves V9, V10 and V6 are in a closed state) to introduce the exhaust gas into the heat exchanger (5) so that the heat would be exchanged. The exhaust gas cooled by the said heat exchange is discharged to outer air via a storage tank while the water produced by the said cooling is stored in a storage tank. When such a heat exchange is not needed, the valves (V5 and V7) are in a closed state and, after the valve V6 is opened and the above-mentioned exhaust gas is exposed to air in the storage tank whereupon the steam is appropriately removed, it is discharged to outer air. It goes without saying that, during such an operation stage, the valve (V4) is in an opened state.

In the starting stage of electric power generation as such, the hydrogen which is supplied from the above-mentioned hydrogen fuel tank (4) originates in the high-pressure plateau region of the above-mentioned hydrogen storage metal alloy and therefore the temperature of the hydrogen storage metal alloy is controlled to a temperature nearly equivalent to that during the above-mentioned hydrogen absorption. However, when release of hydrogen continues and the supplied hydrogen pressure lowers by a decrease in the hydrogen release from the high-pressure plateau region of the said hydrogen storage metal alloy, the above-mentioned controller (3) conducts its valve control as mentioned above for the heat exchange in the heat exchanger (5) and simultaneously the cold/warm water heated by the heat exchanger is passed to the hydrogen fuel tank (4) by making the circulation pump (P3) in an operating state whereupon heating of the hydrogen storage metal alloy is started.

As a result of heating as such, the temperature of the above-mentioned hydrogen storage metal alloy is elevated and as aforementioned the occluded hydrogen in the lower region of the inclined plateau or in the low-pressure plateau region is desorbed. Such a desorbed hydrogen is supplied to the fuel battery cell (1) so that generation of electric power is continuously carried out whereupon the electric power generating capacity of the hydrogen fuel battery can be significantly improved.

With regard to the heating temperature (T2) of such a hydrogen storage metal alloy, since water is used as a cooling/warming medium in this example, its upper limit is around 90° C. but the present invention is not limited to. Such a hydrogen storage metal alloy may be heated with a heater or the like to bring it to a higher temperature. Further, in this example, temperature upon hydrogen absorption is made not higher than 40° C. which is practical by means of cooling due to heat release with a heat exchange to the outer air but the present invention is not limited to. Such a cooling may be carried out by installment of a cooling apparatus or by using as the cooling/warming medium a cooling medium such as flon or ammonia together with a heat pump in which a heat exchange is carried out by compression and expansion of such a cooling medium. Furthermore, in place of such a heat pump, it is also possible to carry out both cooling and heating by the use of a Peltier element.

It is preferred to use a heat exchanger (5) as mentioned above since much electric power is not necessary for heating and cooling, the resulting electric power from the said hydrogen fuel battery can be increased greatly and the efficiency of the hydrogen fuel battery can be improved although the present invention is not limited thereto.

At a next step, when release of hydrogen as such is finished and fresh hydrogen is to be stored, there is a method, in addition to the means of supplying the starting material hydrogen to the hydrogen fuel tank (4) as mentioned above, where electric power is applied to the above-mentioned fuel battery cell (1) and hydrogen produced by decomposition of water is stored.

The above means will be illustrated as follows:

At first, a predetermined direct current is applied to the above-mentioned fuel battery cell (1), the pump (P4) is operated under the condition where the valve (V4) is closed, an outer air is passed into the water which is stored in the storage tank via the above-mentioned generation of electric power so as to contain steam and the air containing the said steam is supplied into the fuel battery cell (1) via the valve (V6).

As a result, water is adhered onto the surface of the positive electrode side in the said fuel battery cell (1), the said adhered water is electrolyzed to give oxygen, air containing the said oxygen is discharged outside the fuel battery cell (1) while hydrogen produced simultaneously by the said electrolysis becomes a hydrogen ion via removal of electron at the above-mentioned positive electrode side, the said hydrogen ion moves in the electrolyte in the same manner as in the above-mentioned electric power generation stage to arrive at the hydrogen electrode side, then receives an electron at the said hydrogen electrode side to form a hydrogen molecule followed by release from the said hydrogen electrode.

Hydrogen released as such is compressed by a pump (P2) where the valve (V2) is in an opened state and supplied to the pressure valve (B2). The hydrogen brought to a predetermined pressure via the said pressure valve (B2) is supplied into the hydrogen fuel tank (4) and is absorbed with the above-mentioned hydrogen storage metal alloy. At that time, in the same manner as in the above-mentioned hydrogen supply from the hydrogen cylinder, the above-mentioned controller (3) adjusts the temperature of the said hydrogen storage metal alloy to 40° C. or lower so that hydrogen can be repeatedly absorbed and released. Thus, the said controller (3) can lower the temperature of the hydrogen storage metal alloy during the hydrogen absorption and elevate the temperature of hydrogen storage metal alloy during the hydrogen release, particularly at the final stage of hydrogen release, whereby an amount of hydrogen suppliable to the fuel battery cell can be increased and much more generation of electric power becomes available.

Symbols used in the drawings have the following meanings: 1 is a fuel battery cell; 2 is an inverter; 3 is a controller (controlling member); 4 is a hydrogen fuel tank (hydrogen storage tank); and 5 is a heat exchanger (temperature adjusting means).

What is claimed is:

1. A hydrogen storage metal alloy which has as its main phase a body-centered cubic structure-type phase exerting a two-stage or inclined plateau characteristic in a hydrogen storage amount vs hydrogen pressure relation, in which the composition ratio of constituent metals for the alloy is suitably adjusted to reduce the stability of the hydrogen occluded in the alloy during the low-pressure plateau region or the lower plateau region of the inclined plateau such that an alloy temperature (T2) during at least a period in a hydrogen release process can be brought to higher than an alloy temperature (T1) in a hydrogen-absorption process (T2>T1) whereby at least part of the occluded hydrogen will be made desorbable during the low-pressure plateau region in the above-mentioned two-stage plateau or the lower plateau region of the inclined plateau, wherein the alloy temperature (T1) during the hydrogen-absorbing process is brought to a range of from the extremely low temperature in the living areas on the earth to 373K, and wherein the hydrogen storage metal alloy is a V alloy not only having a suitably adjusted composition to reduce the stability of the occluded hydrogen but also containing 0 to 95 at % of at least one or more members selected from the group consisting of Nb, Ta, W, Mo, Ti, Cr, Mn, Fe, Al, B, Co, Cu, Ge, Ni and Si.

2. The hydrogen storage metal alloy according to claim 1, wherein the hydrogen storage metal alloy is an alloy having a fundamental composition of the formula:

$$VaTi_{(41-0.4a+b)}Cr_{(59-0.6a-b)}$$

wherein $0 \leq a \leq 70$ at % and $-10 \leq b \leq 10$ at %.

3. The hydrogen storage metal alloy according to claim 2, wherein the hydrogen storage metal alloy is an alloy having a fundamental composition of the formula:

$$V_{(a-d)}M2dTi_{(41-0.4a+b)}Cr_{(59-0.6a-b-c)}M_c$$

wherein $0 \leq a \leq 70$ at %, $-10 \leq b \leq 10+c$, $0 \leq c$, $0 \leq d \leq a$, M is at least one or more members selected from the group consisting of Nb, Mo, Ta, W, Mn, Fe, Al, B, C, Co, Cu, Ge, Ln (various lanthanoid metals), N, Ni, P and Si, and M2 is at least one or more members selected from the group consisting of Mo, Nb, Ta, W, Mn, Fe and Al.

4. The hydrogen storage metal alloy according to claim 3, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

5. The hydrogen storage metal alloy according to claim 2, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

6. The hydrogen storage metal alloy according to claim 1, wherein the hydrogen storage metal alloy is of a body-centered cubic crystal structure mono phase without any spinodal decomposition phase or has a body-centered cubic crystal structure together with only a minimum spinodal decomposition phase with is unavoidably produced.

7. A method for absorbing and releasing hydrogen using a hydrogen storage metal alloy which comprises:

applying repeatedly hydrogen pressurization and depressurization to the hydrogen storage metal alloy of a body-centered cubic structure-type phase exerting a two-stage or inclined plateau characteristic in a hydrogen storage amount vs hydrogen pressure relation to absorb and release hydrogen, and at at least at one stage during the release of hydrogen, making the temperature (T2) of the above-mentioned hydrogen storage metal alloy higher than the temperature (T1) of the hydrogen storage metal alloy during the hydrogen absorption process (T2>T1).

8. The method for absorbing and releasing hydrogen according to claim 7, wherein the alloy temperature (T1) during the above hydrogen-absorbing process is within a range of from the extremely low temperature in the living areas on the earth to 373K.

9. The method for absorbing and releasing hydrogen according to claim 8, wherein the composition ratio of the constituent metals for the alloy is suitably adjusted to reduce the stability of the hydrogen occluded in the alloy during the low-pressure plateau region or the lower plateau region of the inclined plateau such that the temperature of the said alloy can be brought to the above high temperature (T2) whereby at least part of the occluded hydrogen will be made desorbable during the low-pressure plateau region in the above-mentioned two-stage plateau or the lower plateau region of the inclined plateau.

10. The method for absorbing and releasing hydrogen according to claim 9, wherein the hydrogen storage metal alloy is a V alloy containing 0 to 95 at % of at least one or more members selected from the group consisting of Nb, Ta, W, Mo, Ti, Cr, Mn, Fe, Al, B, Co, Cu, Ge, Ni and Si.

11. The method for absorbing and releasing hydrogen according to claim 10, wherein the hydrogen storage metal alloy is an alloy having a fundamental composition of the formula:

$$VaTi_{(41-0.4a+b)}Cr_{(59-0.6a-b)}$$

wherein $0 \leq a \leq 70$ at % and $-10 \leq b \leq 10$ at %.

12. The method for absorbing and releasing hydrogen according to claim 11, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

13. The method for absorbing and releasing hydrogen according to claim 10, wherein the hydrogen storage metal alloy is an alloy having a fundamental composition of the formula:

$$V_{(a+b)}M2dTi_{(41-0.4a+b)}M_c$$

wherein $0 \leq a \leq 70$ at %, $-10 \leq b \leq 10+c$, $0 \leq c$, $0 \leq d \leq a$, M is at least one or more members selected from the group consisting of Nb, Mo, Ta, W, Mn, Fe, Al, B, C, Go, Cu, Ge, Ln (various lanthanoid metals), N, Ni, P and Si, and M2 is at least one or more members selected from the group consisting of Mo, Nb, Ta, W, Fe and Al.

14. The method for absorbing and releasing hydrogen according to claim 13, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

15. The method for absorbing and releasing hydrogen according to claim 10, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

16. The method for absorbing and releasing hydrogen according to claim 7, wherein the composition ratio of the constituent metals for the alloy is suitably adjusted to reduce the stability of the hydrogen occluded in the alloy during the low-pressure plateau region or the lower plateau region of the inclined plateau such that the temperature of the said alloy can be brought to the above high temperature (T2) whereby at least part of the occluded hydrogen will be made desorbable during the low-pressure plateau region in the above-mentioned two-stage plateau or the lower plateau region of the inclined plateau.

17. The method for absorbing and releasing hydrogen according to claim 16, wherein the hydrogen storage metal alloy is a V alloy containing 0 to 95 at % of at least one or more members selected from the group consisting of Nb, Ta, W, Mo, Ti, Cr, Mn, Fe, Al, B, Co, Cu, Ge, Ni and Si.

18. The method for absorbing and releasing hydrogen according to claim 17, wherein the hydrogen storage metal alloy is an alloy having a fundamental composition of the formula:

$$VaTi_{(41-0.4a+b)}Cr_{(59-0.6a-b)}$$

wherein $0 \leq a \leq 70$ at % and $-10 \leq b \leq 10$ at %.

19. The method for absorbing and releasing hydrogen according to claim 18, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

20. The method for absorbing and releasing hydrogen according to claim 17, wherein the hydrogen storage metal alloy is an alloy having a fundamental composition of the formula:

$$V_{(a+b)}M2dTi_{(41-0.4a+b)}M_c$$

wherein $0 \leq a \leq 70$ at %, $-10 \leq b \leq 10+c$, $0 \leq c$, $0 \leq d \leq a$, M is at least one or more members selected from the group consisting of Nb, Mo, Ta, W, Mn, Fe, Al, B, C, Co, Cu, Ge, Ln (various lanthanoid metals), N, Ni, P and Si, and M2 is at least one or more members selected from the group consisting of Mo, Nb, Ta, W, Fe and Al.

21. The method for absorbing and releasing hydrogen according to claim 20, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

22. The method for absorbing and releasing hydrogen according to claim 17, wherein the hydrogen storage metal alloy is of a body-centered cubic crystal structure mono phase without any spinodal decomposition phase or has a body-centered cubic crystal structure together with only a minimum spinodal decomposition phase which is unavoidably produced.

* * * * *

UNITED STATES PATENT AND TRADEMARK OFFICE
CERTIFICATE OF CORRECTION

PATENT NO. : 7,094,493 B2
APPLICATION NO. : 10/991725
DATED : August 22, 2006
INVENTOR(S) : Okada et al.

It is certified that error appears in the above-identified patent and that said Letters Patent is hereby corrected as shown below:

Claim 2, col. 21 line 33, "$VaTi_{(41-0.4a+b)}Cr_{(59-0.6a-b)}$" should be

--$V_aTi_{(41-0.4a+b)}Cr_{(59-0.6a-b)}$--.

Claim 3, col. 21 line 39, "$V_{(a-d)}M2dTi_{(41-0.4a+b)}Cr_{(59-0.6a-b-c)}M_c$" should be --$V_{(a-d)}M2_dTi_{(41-0.4a+b)}Cr_{(59-0.6a-b-c)}M_c$--.

Claim 11, col. 22 line 35, "$VaTi_{(41-0.4a+b)}Cr_{(59-0.6a-b)}$" should be

--$V_aTi_{(41-0.4a+b)}Cr_{(59-0.6a-b)}$--.

Claim 13, col. 22 line 50, "$V_{(a+b)}M2dTi_{(41-0.4a+b)}M_c$" should be

--$V_{(a+b)}M2_dTi_{(41-0.4a+b)}M_c$--.

Claim 18, col. 23 line 25, "$VaTi_{(41-0.4a+b)}Cr_{(59-0.6a-b)}$" should be

--$V_aTi_{(41-0.4a+b)}Cr_{(59-0.6a-b)}$--.

Claim 20, col. 24 line 8, "$V_{(a+b)}M2dTi_{(41-0.4a+b)}M_c$" should be

--$V_{(a+b)}M2_dTi_{(41-0.4a+b)}M_c$--.

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,094,493 B2  
APPLICATION NO. : 10/991725  
DATED : August 22, 2006  
INVENTOR(S) : Okada et al.

It is certified that error appears in the above-identified patent and that said Letters Patent is hereby corrected as shown below:

column 21, line 33, should read as follows:

"$VaTi_{(41-0.4a+b)}Cr_{(59-0.6a-b)}$" should be -- $V_aTi_{(41-0.4a+b)}Cr_{(59-0.6a-b)}$ --;

and column 21, line 39, should read as follows:

"$V_{(a-d)}M2dTi_{(41-0.4a+b)}Cr_{(59-0.6a-b-c)}M_c$" should be -- $V_{(a-d)}M2_dTi_{(41-0.4a+b)}Cr_{(59-0.6a-b-c)}M_c$ --;

and column 21, line 45, should read as follows:

"consisting of Mo, Nb, Ta, W, Mn, Fe and Al." should be -- consisting of Mo, Nb, Ta, W, Fe and Al. --;

and column 22, line 36, should read as follows:

"$VaTi_{(41-04a+b)}Cr_{(59-0.6a-b)}$" should be -- $V_aTi_{(41-04a+b)}Cr_{(59-06a-b)}$ --;

and column 22, line 50, should read as follows:

"$V_{(a+b)}M2dTi_{(41-0.4a+b)}M_c$," should be -- $V_{(a-d)}M2_dTi_{(41-0.4a+b)}M_c$ --;

and column 22, line 53, should read as follows:

"consisting of Nb, Mo, Ta, W, Mn, Fe, Al, B, C, Go, Cu, Ge," should be -- consisting of Nb, Mo, Ta, W, Mn, Fe, Al, B, C, Co, Cu, Ge, --;

and column 23, line 25, should read as follows:

"$VaTi_{(41-0.4a+b)}Cr_{(59-0.6a-b)}$" should be -- group consisting of $V_aTi_{(41-0.4a+b)}Cr_{(59-0.6a-b)}$ --;

and column 24, line 7, should read as follows:

"$V_{(a+b)}M2dTi_{(41-0.4a+b)}M_c$" should be -- $V_{(a+b)}M2_dTi_{(41-0.4a+b)}M_c$ --;

Signed and Sealed this

Sixteenth Day of February, 2010

David J. Kappos  
*Director of the United States Patent and Trademark Office*